United States Patent
Leedom et al.

(10) Patent No.: US 7,493,407 B2
(45) Date of Patent: Feb. 17, 2009

(54) METHOD AND APPARATUS FOR CONTROLLING THE ALLOCATION OF BANDWIDTH OF A NETWORK ACCESS POINT TO AN APPLICATION HAVING A MESSAGE TRANSMITTED ON THE NETWORK

(75) Inventors: David Arlen Leedom, Escondido, CA (US); Jose Eulalio Garza, San Diego, CA (US); Richard Allen Stakelum, San Diego, CA (US); Leigh William Ramsay, Poway, CA (US); Glenn Michael Irvine, San Diego, CA (US)

(73) Assignee: DRS Technical Services, Inc., San Diego, CA (US)

( * ) Notice: Subject to any disclaimer, the term of this patent is extended or adjusted under 35 U.S.C. 154(b) by 944 days.

(21) Appl. No.: 10/639,204

(22) Filed: Aug. 12, 2003

(65) Prior Publication Data
US 2004/0143663 A1   Jul. 22, 2004

Related U.S. Application Data

(60) Provisional application No. 60/319,472, filed on Aug. 14, 2002.

(51) Int. Cl.
  *G06F 15/16*  (2006.01)
  *G06F 15/173* (2006.01)
  *G06F 15/177* (2006.01)
(52) U.S. Cl. .................. 709/232; 709/224; 709/238
(58) Field of Classification Search ......... 709/217–224, 709/232–238
See application file for complete search history.

(56) References Cited

U.S. PATENT DOCUMENTS

| | | | |
|---|---|---|---|
| 5,615,323 A | 3/1997 | Engel et al. | |
| 5,751,964 A | 5/1998 | Ordanic et al. | |
| 6,154,776 A | 11/2000 | Martin | |
| 6,366,761 B1 | 4/2002 | Montpetit | |
| 6,466,984 B1 | 10/2002 | Naveh et al. | |
| 6,560,243 B1 | 5/2003 | Mogul | |
| 6,578,077 B1 * | 6/2003 | Rakoshitz et al. | 709/224 |
| 2001/0003830 A1 | 6/2001 | Nielsen | |

(Continued)

OTHER PUBLICATIONS

PCT WO01/05098, Jan. 18, 2001, Malibu Networks, Jacob Jorgensen, pp. 1-254, "TCP/IP Packet-Centric wireless transmission system architecture".*

(Continued)

*Primary Examiner*—Haresh N Patel
(74) *Attorney, Agent, or Firm*—Sonnenschein Nath & Rosenthal LLP

(57) ABSTRACT

An automated bandwidth monitoring and control method and system provides for real time, dynamic control of the allocation of bandwidth to selected applications in a communications network based on the selected operational context and the fixed bandwidth available at a network access point. A graphical user interface, using operational terms common to the overall enterprise in which and for which the network is implemented and understandable by an operator, displays the bandwidth allocation strategy, and in substantially real time displays statistics representative of actual bandwidth use at the access point, input functions for modifying the bandwidth allocation strategy in substantially real time and estimated message delay distributions for the applications of the strategy determined based on the actual bandwidth use statistics.

26 Claims, 11 Drawing Sheets

U.S. PATENT DOCUMENTS

| | | |
|---|---|---|
| 2002/0178263 A1 | 11/2002 | Hreha et al. |
| 2003/0009507 A1 | 1/2003 | Shum |
| 2003/0028641 A1 | 2/2003 | Zhang et al. |
| 2003/0145088 A1* | 7/2003 | Bhogal et al. ............... 709/226 |
| 2007/0028002 A1* | 2/2007 | McCanne ................... 709/238 |

OTHER PUBLICATIONS

PCT WO00/35130, Jun. 15, 2000, Ukiah Software, Inc., Rakoshitz et al., pp. 1-72, "Directory enabled policy management tool for intellegent traffic management".*

EP 1158728 A2, Nov. 28, 2001, Alcatel Internetworking, Mathieu et al., pp. 1-22, "Packet processor with multi-level policing logic".*

* cited by examiner

METHOD AND APPARATUS FOR CONTROLLING THE ALLOCATION OF BANDWIDTH OF A NETWORK ACCESS POINT TO AN APPLICATION HAVING A MESSAGE TRANSMITTED ON THE NETWORK

CROSS REFERENCE TO RELATED APPLICATION

This application claims the benefit of U.S. Provisional Application No. 60/319,472, filed Aug. 14, 2002, assigned to the assignee of this application and incorporated by reference herein.

FIELD OF THE INVENTION

The present invention relates generally to allocating network bandwidth and, more particularly, automated monitoring and control of the allocation of available bandwidth of a network access point to selected applications based on application information transfer requirements and operational priorities.

BACKGROUND OF THE INVENTION

Bandwidth available for transmission of information in a communications network is constrained by the limits of the equipment used to transmit and receive information carrier signals and the physical properties of the media over which the carrier signals are transmitted. For example, the bandwidth available for through-the-air data signal transmission is a function of the frequency of the carrier signal. It is well known that the bandwidth available for through-the-air signal transmission, which is typically performed at radio frequencies, is much less than that available for signal transmission on other media, such as optical fiber.

In a communications network, oftentimes many applications, which are used to generate messages containing, for example, text files or streaming video, for transfer over the network and are installed at various respective network communications devices, such as computers having network communications capabilities, attempt to transmit messages over the network simultaneously and, therefore, compete for the fixed available bandwidth of a network access point. Many network protocols, including the commonly used Internet Protocol ("IP"), do not regulate bandwidth use by any application, such that a message transmission from an application consumes as much of the available bandwidth as the application can obtain. Consequently, once an application is granted access to the communications network, an application can and often does use more bandwidth than it needs for effective operation, and uses such bandwidth until a message transmission is completed.

Some prior art networks regulate bandwidth usage by pre-allocating predetermined bandwidths to respective applications. For example, prior art communications network systems on aircraft carriers pre-allocate fixed bandwidths to respective network applications whose bandwidth operating requirements can be fixed or variable. The network applications are coupled to a network access point, which has a predetermined available bandwidth and through which through-the-air communication links between the communications system on the aircraft carrier and a remote a communications site are established. As fixed bandwidths are pre-allocated to the respective applications, the bandwidth pre-allocated to one application is not available for use by any other application, even when the one application is not using a portion or all of the pre-allocated bandwidth. Consequently, in such networks, the total bandwidth that the applications of the network require or use oftentimes exceeds the available bandwidth at the access point.

In addition, when competition for bandwidth between and among applications is not regulated, messages containing time sensitive or high priority information may not be delivered promptly to a destination communications device because of a lack of available bandwidth. For example, applications in a network often simultaneously attempt to transmit low priority data, such as power point or text files; medium priority data, such as streaming video which does not transmit properly if sufficient bandwidth is not allocated; and also high priority, time critical data. If the bandwidth allocation in the network is unmanaged, such that the aggregate message traffic exceeds the total bandwidth capacity at an access point, low and medium priority data can compete with the time critical data and cause the time critical data to experience undue delay.

Although prior art network communications data flow control devices, such as sold under the brand names Packeteer's PacketShaper™ or Sitara Network's QoSWorks™, recognize messages based on IP header information included with the message and allocate bandwidth accordingly based on the recognized message, the flow control devices do not allocate bandwidth with regard to the application that is the source of the message, the actual priority of a message from a first application relative to the priorities of other messages from other respective applications simultaneously vying for bandwidth or the reasons why a user of an application transmitted a particular message.

In addition, prior art communications networks do not provide real time information concerning actual, and changes in actual, use of the available bandwidth of an access point by the various applications in the network. Therefore, a user of an application or a network operator cannot plan transmission of a message from, or dynamically modify bandwidth allocation or relative priority for, a selected application according to real time changes in bandwidth usage or operational situations. For example, a user of an application on an aircraft carrier may be unaware of changes in an operational situation on the carrier which should result in the user not attempting to transmit medium priority messages, such as streaming video data, through the network to avoid occupying a portion of the available bandwidth of an access point.

Therefore, a need exists for method and system for automated monitoring and control of the allocation of network bandwidth to applications of a communications network, where bandwidth constraints and relative priorities can be assigned to respective applications in real time at a graphical user interface ("GUI") and where the GUI displays, using operational terms common to the overall enterprise in which and for which the network is implemented, the bandwidth constraints, relative priorities and other information constituting a selected bandwidth allocation strategy, inputs for modifying the strategy, actual bandwidth use at an access point and estimates of message transfer delays for applications of the selected strategy which are computed based on the actual bandwidth use at the access point.

SUMMARY OF INVENTION

In accordance with the present invention, method and system for automated monitoring and control of allocation of available communications network bandwidth provide for dynamic, real time allocation of available bandwidth associated with a network access point to network applications based on operational context and in view of information transfer response requirements of the respective applications.

In a preferred embodiment, a bandwidth monitoring and allocation control ("BMAC") apparatus includes (i) a user application module, which includes known application information in its memory; (ii) a control strategy module, which based on network operator inputs at a graphical user interface ("GUI") of the BMAC apparatus, generates and stores in its memory a bandwidth allocation strategy including priorities and bandwidth constraints for respective known applications stored at the user application module; and (iii) a message statistics module which generates and stores in its memory data and statistics representative of actual bandwidth use at a network access point associated with the BMAC apparatus. The BMAC apparatus is for coupling to a prior art network flow control device, where the flow control device is coupled to a network access point and a subsidiary network, such as a local access network ("LAN") which includes applications that seek to transmit messages through the access point. The flow control device routes received application messages to a bandwidth allocation controller module in the BMAC apparatus. The controller module transmits technical, network message traffic flow control instructions, representative of the bandwidth allocation strategy, to the flow control device. The flow control device, based on the technical control instructions, implements the bandwidth allocation strategy for the access point, such that only those application messages received at the flow control device which are identified in the technical flow control instructions are allocated a portion of the fixed available bandwidth of the access point. Further, the controller module retrieves actual bandwidth use data for the access point, which is in technical network format, from the flow control device.

In addition, the controller module routes to the GUI common, operational term representations of technical network information, such as strategy and actual bandwidth use data, stored in the respsective databases of the control strategy, statistics and the application modules. The GUI displays such operational term data representations and data entry boxes, also in operational terms, and suitably routes data entries, via the controller module, to other modules in the BMAC apparatus. In a preferred embodiment, the GUI displays, using common operational terms and in real time, identities of applications of a selected strategy and corresponding bandwidth constraints and relative priorities assigned to the applications, identities of applications that have been allocated bandwidth and amount of the available bandwidth allocated to each messaging application of the strategy.

In a preferred embodiment, the statistics module, based on data representative of actual bandwidth use at the access point that the controller module retrieves from the flow device, generates statistics of message lengths and time between messages for each of the messaging applications of a strategy.

In a further preferred embodiment, the strategy module, based on the selected strategy and actual bandwidth use statistics generated at the statistics module, models throughput allocation for all applications of the strategy for generating a distribution of message delays for the respective applications at the access point and displays the results of the model, in common operational terms, at the GUI.

DETAILED DESCRIPTION OF PREFERRED EMBODIMENTS

The present invention of automated monitoring and control of bandwidth allocation among applications in a communications network is described below in connection with the allocation of a fixed bandwidth associated with an access point of a communications network, where the network is installed on an aircraft carrier and facilitates transmission of application messages on radio frequency carrier signals between the aircraft carrier and a land based communications center. It is to be understood that the present invention applies to any communications network having a plurality of applications and an access point with a fixed bandwidth available and through which messages can be transmitted between the network and another communications network or communications device.

Figure 1:
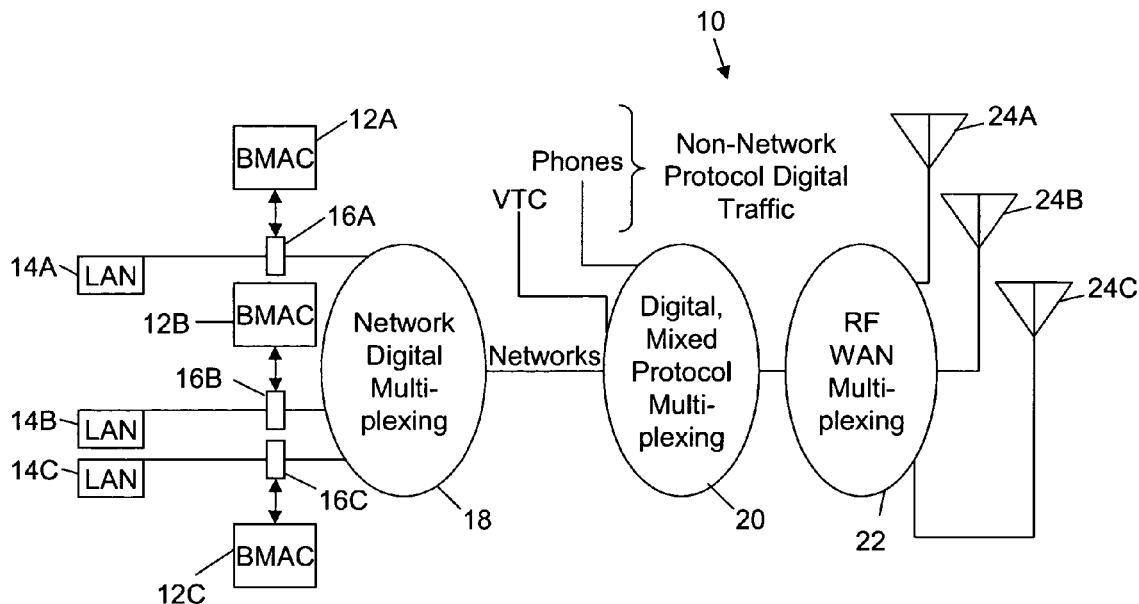
FIG. 1 is a communications network including a bandwidth monitoring and allocation control apparatus in accordance with the present invention.

FIG. 1 illustrates a preferred embodiment of a communications network 10 including a bandwidth monitoring and allocation control ("BMAC") apparatus, in accordance with the present invention, which provides for monitoring of bandwidth use at a network access point and dynamic allocation of bandwidth among applications in the network based on priorities and bandwidth constraints assigned to the respective applications at the BMAC apparatus. Referring to FIG. 1, the network 10 includes BMAC apparatuses 12A, 12B and 12C respectively coupled to prior art network flow control devices 16A, 16B and 16C. The flow control devices 16A, 16B and 16C respesctively couple a plurality of local access networks ("LANs") 14A, 14B and 14C to a digital multiplexing network route 18. A digital, mixed protocol multiplexer 20 is coupled to the router 18 and to non-network protocol digital message traffic sources, such as a video teleconferencing computer ("VTC") and telephones. A radio frequency ("RF") wide area network ("WAN") multiplexer 22 couples the digital multiplexer 20 to antennae 24A, 24B and 24C. The antennae 24 establish radio communication links between the network 10, which for purposes of illustration is installed on an aircraft carrier, and a land based communications device. It is to be understood that, in accordance with the present invention, the BMAC apparatus 12 can be installed at each and any network segment in a communications network that is coupled to a network access point, such as the router 18 and the multiplexer 20 of the network 10, for controlling transmission of messages from respective applications through the access point.

The LANs 14A, 14B and 14C are conventional communications networks including a plurality of communications devices, such as computers, PDAs, etc. Each of the communications devices includes one or more applications for generating information content, such as a power point file, a streaming video and music file, a text file, etc., and transmitting a message containing the information content, over the LAN, to a destination communications device, such as a communications device having an Internet address whose server is located remotely from the LAN.

The flow control device 16 is a conventional, prior art device which is coupled to at least one subsidiary communications device or subsidiary communications network ("subnet"), such as a LAN, containing a plurality of communications devices. The flow control device 16 controls transmission of application messages received from a subsidiary communications device or subnet to an access point by allocating a portion of the predetermined bandwidth of the access point to selected messages. The regulation of message traffic transmission to the access point is based on technical network flow control instructions, which the BMAC apparatus 12 preferably provides in accordance with the present invention. In addition, the flow control device 16 generates, and provides that the BMAC apparatus 12 can retrieve therefrom, time-stamped data representative of the identities of the applications that are the sources of messages received and also actually transmitted to the access point, the amount of bandwidth each of the transmitted application messages uses and the start and stop times of application messages transmitted to the access point.

The network router 18 is a conventional router and constitutes a network access point in the network 10 through which a subsidiary communications device or a subnet transmits application messages to, for example, a remote network or a communications device that is upstream of the router 18 or located remotely from the network which contains the router 18. As well known in the art, an access point has a predetermined available bandwidth that limits the number of messages, each of which requires and uses bandwidth, that can be simultaneously transmitted therethrough.

The digital, mixed protocol multiplexer 20 is a conventional router for receiving and multiplexing network and non-network protocol digital message traffic. The multiplexer 20, like the router 18, is an access point in the network 10 having a predetermined fixed available bandwidth.

The RF WAN multiplexer 22 is a conventional wireless RF router that generates RF carrier signals based on messages received from the multiplexer 20. The RF signal carrier defines the overall maximum bandwidth for communications between the network 10 and a remote communications device or network. In a preferred embodiment, the maximum available bandwidth of the router 18 access point is usually a fraction of the maximum available bandwidth of the WAN multiplexer 22.

The antennae 24A, 24B and 24C are conventional devices, well known in the prior art, for transmitting RF carrier signals and can be combined into a single integral antenna, also well known in the art.

Figure 2:
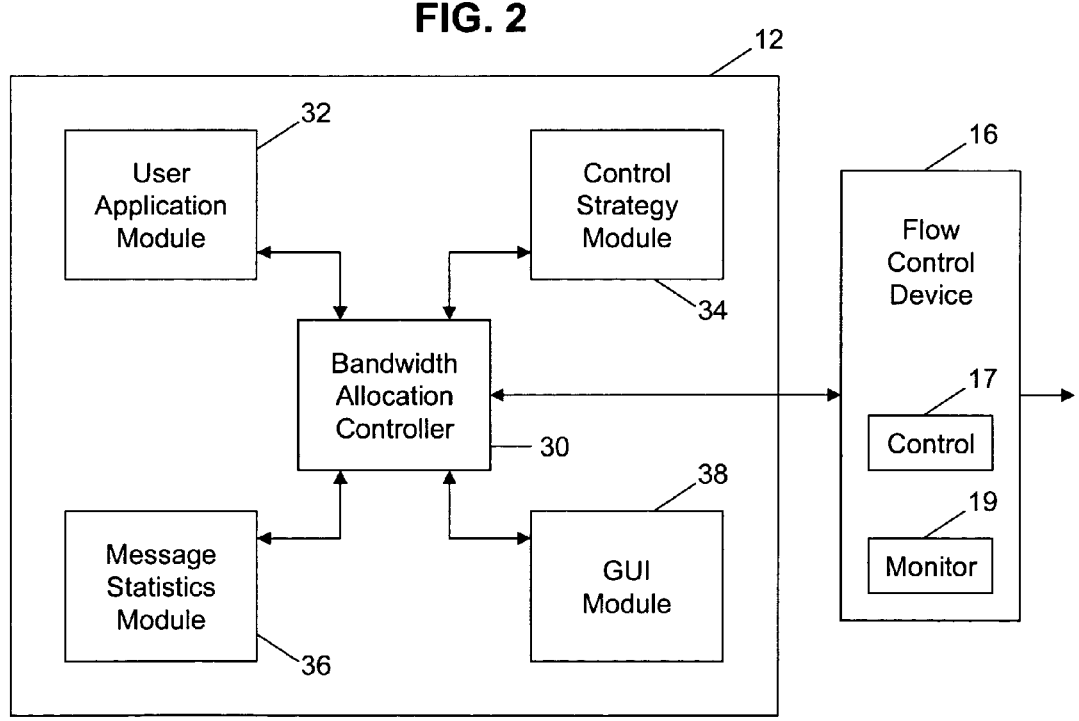
FIG. 2 is a functional block diagram of a preferred embodiment of a bandwidth monitoring and allocation control apparatus, in accordance with the present invention, coupled to a prior art flow control device.

FIG. 2 illustrates a preferred embodiment of the BMAC apparatus 12 coupled to the prior art flow control device 16. It is to be understood that the generalized description of the BMAC apparatus 12 and its operation in relation to the flow control device 16 and the LAN 14 provided below applies to each of the BMAC apparatuses 12A, 12B and 12C and their respective operations in relation to the flow control devices 16A, 16B and 16C and the LANs 14A, 14B and 14C, as shown in FIG. 1. Referring to FIG. 2, the BMAC apparatus 12 includes a bandwidth allocation controller module 30 coupled to a user application module 32, a control strategy module 34, a message statistics module 36 and a graphical user interface ("GUI") module 38. In addition, referring to FIGS. 1 and 2, the bandwidth allocation controller module 30 is coupled to a subnet, such as the LAN 14A and the router 18, via the flow control device 16. A control module 17 and a monitoring module 19 in the flow control device 16 respectively perform the message traffic control and monitoring of bandwidth use functions at the flow control device 16 which are described above and well known in the art. It is to be understood that each of the modules of the inventive BMAC apparatus 12, which are described below as performing data processing operations, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in accordance with the present invention, the modules of the BMAC apparatus 12 can be combined, as suitable, into composite modules.

For ease of reference, the following terms, which are used to describe the present invention, are defined.

Known Application: An application having identifying technical packet header parameters stored in the database of the user application module 32.

Unknown Application: An application that does not have identifying technical packet parameters stored in the database of the user application module 32.

Bandwidth Constraint: The maximum data transmission rate that is assigned to an application and at which the application can transmit data to an access point, such as the network router 18.

Application Information: Information, such as a text or power point file, included in a message that an application transmits to a destination communications device, over a communications network, in the form of one or more discrete data packets or as a stream of data packets. Each of the data packets has a fixed or variable size and includes a technical packet header which facilitates transmission to the destination device over the communications network. In accordance with the present invention, the technical packet header includes information from which the BMAC apparatus 12 can determine, based on data stored in the database of the application module 32, whether the application that is the source of the message is a known or unknown application.

Known Application Information: A message, i.e., a data packet containing information content, such as a text file, and the packet header associated with the data packet, from an application that the BMAC apparatus 12 determines is identified in the application module 32 and, therefore, considers to be useful information. Depending on the strategy, the BMAC apparatus 12 attempts to allocate bandwidth for effectuating transmission of the information content of the message to the access point.

Negative Information: The difference between the demonstrated ability of an access point, such as the network router 18, to transfer useful information at a maximum bandwidth and the bandwidth for the network router 18 specified by its manufacturer. The BMAC apparatus 12 does not consider that negative information is useful.

Retransmitted Information: Information that a communications device needs to retransmit to replace information that is lost, such as, for example, when a subnet routes so much information to an access point that the maximum bandwidth of the access point is exceeded. Retransmission of the information is required to permit proper reconstruction of the message at the destination device. It is noted that, in network communications, the expectation is that not all of the transmitted information can be reliably reconstructed, such that only lost information that requires reliable reconstruction is retransmitted. Except for the single retransmitted data packet which is used to reconstruct the message, retransmitted data packets are not considered useful information. The retransmissions of identical data packets, which ultimately are not used to reconstruct a message, occupy network bandwidth without contributing to the transfer of useful information.

Unknown Application Information: Information from an application that is unknown to the BMAC apparatus 12, based on data stored in the user application module 32. After the BMAC apparatus 12 identifies information, i.e., a message, as being from an unknown application, the BMAC apparatus 12 further determines, based on input from an operator, or input generated by prior art artificial intelligence technology ("AIT") or intelligent agent technology ("IAT") software algorithms, whether the unknown application is legitimate or illegitimate. The AIT and IAT software algorithms, which preferably are included in and performed by the controller module 30, analyze network behavior of messages from unknown applications. For example, where the BMAC apparatus 12 operates in a communications network installed on an aircraft carrier, the AIT and IAT software monitors, in relation to the messages being transmitted from unknown applications, such network behavior as time of day, particular watch (shift), source or destination of messages, and packet parameters including source port number, MAC address, length, repetition rate and interval to elicit further information concerning the sources of the messages from unknown applications. A legitimate unknown application is one for which, if the application were known, the BMAC apparatus 12 would attempt to allocate bandwidth for the application because the information contained in the message from the unknown application includes useful information. An illegitimate unknown application is not needed or wanted on, for example, a subnet and, therefore, the BMAC apparatus 12 considers that such information is not useful. For example, a video game that a sailor on an aircraft carrier surreptitiously downloaded from the Internet would constitute an unknown, illegitimate application which has specific network behavior that a knowledgeable operator of the BMAC apparatus, or the AIT or IAT software within the BMAC apparatus 12 itself, can identify so that appropriate measures can be taken.

Useful Information: Information, such as a data packet containing portions of a text or power point file, from a known application or a legitimate unknown application, and the packet header associated with the data packet. All other information, such as data packet retransmissions, unknown and illegitimate application messages which can originate from the subnet or a remote source, noise and negative information traffic is considered not useful.

Noise: A portion of an RF signal transmission that arrives at an access point and occupies bandwidth that otherwise may contain useful information. For example, noise in the data packet portion of an RF signal transmission can result in a need to retransmit the data packet.

Unknown Talker: A message generated by an unknown application or the erroneous operation of a known application.

Throughput: The rate at which an access point transfers useful information. In other words, the portion of the predetermined maximum available bandwidth of the access point that is available for allocation to a known application or a legitimate unknown application. It is noted that the bandwidth allocated to, for example, a subnet or individual applications within a subnet, is occupied with a variety of data, such as packet header, protocol, etc., in addition to information content.

Actual Throughput: The actual and current rate of transmission of useful information through, for example, a subnet or an access point.

Available Throughput: The actual rate that a subnet or access point can currently transmit useful information. In other words, available throughput is the bandwidth of the subnet or access point less the bandwidth occupied by unknown application information traffic, noise and negative information traffic.

Lost Throughput: The sum of unknown application information traffic, noise and negative information traffic. Thus, available throughput is the predetermined bandwidth of the access point bandwidth less lost throughput.

Residual Throughput: The difference between available throughput and actual throughput.

Figure 3:
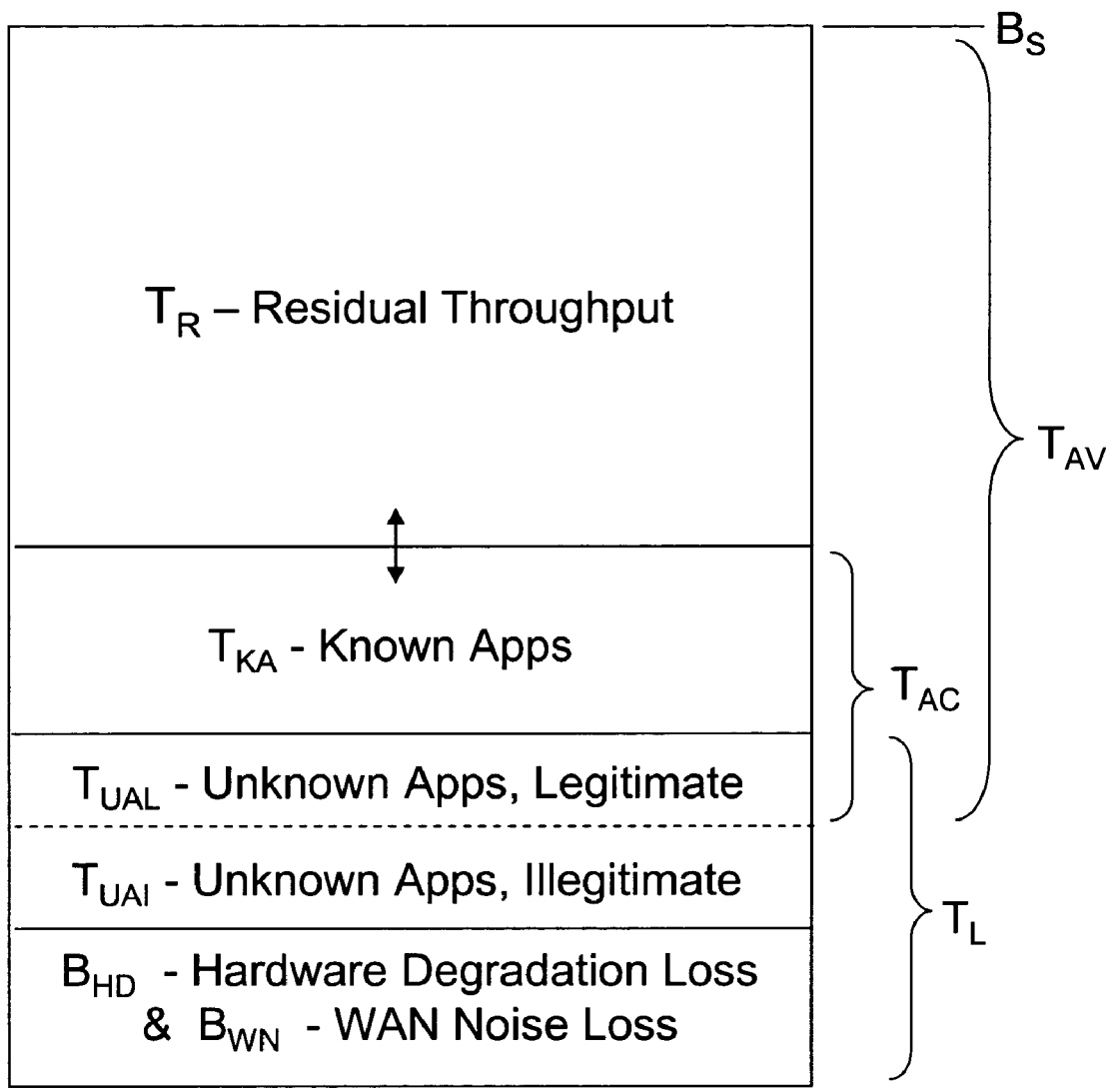
FIG. 3 is a diagram illustrating bandwidth use at an access point of a communications network.

FIG. 3 is a diagram illustrating typical bandwidth use at an access point of a communications network having a specified bandwidth $B_S$. Referring to FIG. 3, the following equations describe bandwidth use at the access point in terms of the definitions set forth above:

$$T_{AV} = B_S - (B_{HD} + B_{WN}) - T_{UAI}$$

$$T_R = T_{AV} - T_{AC} = B_S - T_L - T_{KA}$$

$$T_{AC} = T_{APS} = T_{UAL} + T_{KA}$$

$$T_L = T_{UA} + (B_{HD} + B_{WN})$$

$$T_{UA} = T_{UAL} + T_{UAI}$$

$$T_{NI} = B_{HD} + B_{WN} + T_{UAI}$$

where $T_{AV}$ is available throughput, $T_{AC}$ is actual (current) throughput, $T_L$ is total throughput lost, $T_{NI}$ is bandwidth used by negative information, $T_R$ is residual throughput, $T_{KA}$ is bandwidth used by known applications, $T_{UAL}$ is bandwidth used by legitimate unknown applications, $T_{UAI}$ is bandwidth used by illegitimate unknown applications, $B_{HD}$ is bandwidth used based on hardware degradation loss and $B_{WN}$ is bandwidth used based on WAN noise loss.

Referring again to FIG. 2, the user application module 32 includes a database (not shown) for storing structured user application information in data fields that correlate technical packet headers, which identify respective known applications, to pre-defined technical traffic and bandwidth utilization flow control command information. The technical flow control information associated with the applications is used to generate technical flow control instructions which are transmitted to the flow control device 16 and the flow control device 16 uses to control message traffic to the router 18. In addition, the database of the user application module 32 includes processing instructions for identifying whether a message is associated with a known application, based on the technical packet header included with the message. Also, the database of the module 32 includes common operational terms corresponding to the known applications which are identified in the database. In a preferred embodiment, when the user application module 32 determines from the technical packet header whether the source of a message is a known or unknown application, the module 32 routes this information via the controller module 30 to the GUI 38 for display, preferably in operational terms.

The control strategy module 34 includes a database (not shown) for storing structured network control strategy information which is included in a bandwidth allocation strategy in accordance with the present invention. The strategy information preferably includes bandwidth constraints and priorities for the known applications of a strategy; a prioritization strategy, which determines order of priority for allocating bandwidth among applications of various relative priorities simultaneously vying for the available bandwidth of the access point based on whether an application is as operationally important as another application that also needs bandwidth; and class, which is a logical grouping of messages sharing similar or identical characteristics, such as source application, protocol, address or a set of addresses. In addition, the database of the module 34 includes technical flow control information from which technical flow control instructions, which the flow control device 16 uses to control transmission of application messages received from the subnet, such as the LAN 14, to the access point, in accordance with a selected strategy, are generated. Further, as discussed in greater detail below, the strategy module models throughput allocation to all applications of a selected strategy to estimate whether allocating a specific bandwidth to a known application, in accordance with a selected strategy, in view of the bandwidth available at an access point, likely would result in satisfactory operational performance of the application.

The monitor 19 of the flow control device 16 routes application messages received from the subnet, such as the LAN 14, to the controller module 30. The controller module 30 removes or strips the technical packet header from the received data packet(s) of the message. The controller module 30 determines, in substantially real time and based on the stripped packet header and also the known application information and the message source identification processing instructions stored in the user application module 32, whether the message is from a known or unknown application. The controller module 30 suitably provides this information, in real time or substantially real time, to the strategy module 34. Also, the controller module 30 retrieves, from the monitor module 19 of the flow control device 16, data representative of actual bandwidth use by applications at the access point, and routes this actual bandwidth use data to the statistics module 36. In a preferred embodiment, the controller module 30 includes prior art AIT and IAT software algorithms and performs the AIT and IAT algorithms for generating information concerning the sources of unknown application messages based on analysis of network behavior relating to the unknown application message traffic.

The controller module 30 also reconstructs the original message from the stripped data packet(s) and, in accordance with the strategy, routes the reconstructed application message(s), with the corresponding technical flow control parameter instructions, to the flow device 16 in substantially real time. The controller module 17 of the flow device 16 implements the selected strategy at the access point, based on the technical flow control parameter instructions transmitted by the controller module 30. The technical control parameter instructions cause the flow control device 16 to transmit to the access point only those application messages identified in the strategy and to allocate bandwidth to those application messages in accordance with the bandwidth constraints and priorities respectively assigned to the applications in the strategy. Thus, the BMAC apparatus 12, via exchange of data with the flow control device 16, implements the bandwidth allocation strategy at the access point with respect to the received application messages in an automated manner and in substantially real time, without requiring active and ongoing network operator input.

The message statistics module 36 stores in its database (not shown) time-stamped message statistics representative of the bandwidth actually used by messages from known applications that are transmitted to an access point. The bandwidth use message statistics are based on the time stamped data, i.e., message start and stop times, that the controller module 30 retrieves from the monitor module 19 of the flow control device 16. In addition, the statistics module 36 stores in its database message statistics representative of the applications that are the sources of messages received at the flow control device 16 and then routed by the monitor 19 of the flow control device 16 to the controller module 30. In a preferred embodiment, the message statistics include the following classifications concerning application messages routed to the controller module 30: whether the message is from a known or unknown application, identity of an identified known application, whether an unknown application is legitimate or illegitimate and the priority of the identified known application. In a preferred embodiment, the statistics module 36 generates bandwidth use statistics for each known application, each defined priority group and the group of unknown applications. In still a further preferred embodiment, the statistics module 36 generates message length and frequency statistics for each known application over a predetermined time interval. As discussed in detail below in the text accompany the description of FIGS. 7, 9 and 10, the strategy module 34 uses the message statistics to estimate the fit of a bandwidth allocation strategy to the predetermined bandwidth of an access point.

The GUI 38 is a conventional device, such as a flat screen monitor or a touch screen, and includes an associated input device (not shown), such as a keyboard, mouse, voice input device or the like. The GUI 38 receives from the controller module 30 common operational term data transmitted from the controller module 30 itself, the statistics module 36 and the strategy module 34. In a preferred embodiment, the GUI 38 displays, using common operational terms understandable by an operator of the BMAC apparatus 12, message statistics such as bandwidth use by applications at the access point. In addition, the GUI 38 displays, using common operational terms, input control functions that permit a network operator to dynamically and in substantially real time change bandwidth constraints and priorities for known applications, thereby modifying a selected strategy in substantially real time. The GUI 38 preferably displays drop-down menus that facilitate input of data, such as, for example, assignment of a maximum bandwidth constraint or a priority to a selected application.

In a preferred embodiment, the BMAC apparatus 12 in the communications network 10 is suitably initialized, through operator interaction with the GUI 38 as discussed in detail below in connection with the text accompanying the description of FIGS. 4 and 5, to store technical and common operational term data defining at least a first bandwidth allocation strategy in the databases of the user application and control strategy modules 32 and 34, respectively. The bandwidth allocation strategy on an aircraft carrier, for example, may correspond to a training or an active engagement operational context and there may be several strategies stored at the BMAC 12 for a single operational context.

In a preferred embodiment, the strategy module 34 classifies messages from known applications into a plurality of groups where each group of known applications is assigned a bandwidth constraint and a relative priority. The following are exemplary application message classifications that may be implemented at a BMAC apparatus within a communications network, such as installed in an aircraft carrier, in accordance with a preferred embodiment of the present invention.

Category 1: A message from an application that depends upon sequential data packet delivery, such as a video or audio data stream that always requires a nominally constant bandwidth, and includes a technical packet header containing data from which a destination communications device, such as a video teleconferencing computer ("VTC"), the monitor 19 of the flow control device 16 and the BMAC apparatus 12 itself, can determine the application that is the source of the message. Thus, a category 1 message requires assignment of a bandwidth constraint sufficient to accommodate the nominal constant bandwidth and a priority ensuring that the application always has that bandwidth available without interruption.

Category 2: A category 1 message, except that the bandwidth allocated to the message is also made available for other applications. Therefore, whether a category 2 is allocated bandwidth at a particular time depends upon its priority in relation to the priority of an application simultaneously competing for bandwidth.

Category 3: A message transmitted as bursts of data packets, carrying information that is quickly perishable with latency, such that, for example, even seconds of latency may be critical, and including a technical packet header containing data from which the destination device can determine the application that is the source of the message. The bandwidth constraint assigned to a category 3 message is a function of the volume of data contained in the message. A category 3 message is assigned a priority to ensure immediate or substantially immediate transmission. In a preferred embodiment, a category 3 message having a small volume of data is assigned a relatively low level bandwidth constraint to avoid interruption of other applications having lower priority.

Category 4: A message transmitted as bursts of data packets, carrying information that is moderately perishable with latency, for example, minutes of delay are acceptable, and including a technical packet header containing data from which the destination device can determine the application that is the source of the message. In a preferred embodiment, the category 4 message is assigned a bandwidth constraint that slows down transmission consistent with the tolerance of human nature to wait for a result, because an occasionally long delay for less important traffic is deemed acceptable. The category 4 message is assigned a priority consistent with message importance.

Category 5: A message transmitted as bursts of data packets, carrying information that is moderately perishable with latency, such that, for example, minutes of delay are acceptable, and including a technical packet header containing data from which the destination device cannot determine the application that is the source of the message. Like a category 4 message, the bandwidth constraint assigned to a category 5 message can be tight because a human does not await the result. The category 5 message traffic is assigned a priority consistent with message importance.

Category 6: A message transmitted as bursts of data packets, carrying information that is very insensitive to delays and including a technical packet header containing data from which the destination device can determine the application that is the source of the message. The bandwidth constraint assigned to a category 6 message can be tight and the priority very low.

In a preferred embodiment, the strategy module 34 includes processing instructions for allocating bandwidth among applications when there is insufficient bandwidth at the access point to allocate bandwidth to each of several applications simultaneously attempting to transmit a message to the access point. When there is insufficient bandwidth, the strategy module 34 initially allocates bandwidth to the application with the highest priority and, for applications having the same priority, allocates bandwidth to applications on a first come, first served basis. In addition, the strategy module 34 makes any bandwidth that is allocated to an application, but not used by the application in view of its bandwidth constraint, available for assignment to other applications.

In a preferred embodiment, the strategy module 34 preempts or interrupts a currently transmitting ("actively messaging") first application if a second application, which has a higher priority than the first application, also simultaneously seeks allocation of bandwidth from the access point and there is insufficient reserve bandwidth to transmit a message from the second application while continuing to transmit the message from the first application. In a preferred embodiment, the strategy module 34 determines priority among selected applications of a strategy that simultaneously compete for available bandwidth by assessing whether allocated bandwidth can be shifted from the most delay tolerant and least operationally important of the applications to other applications having less delay tolerance and higher relative priorities. When preemption is required, the strategy module 34 generates and transmits to the controller module 30 control signals and associated technical control information which cause the controller module 30 to transmit new technical control instructions to the control flow device 16 that interrupt or preempt an active application message transmission, even after the application has been allocated bandwidth for transmitting the message to the access point. Where an application priority is high enough to preempt some actively messaging applications, then the available bandwidth is the residual throughput plus that bandwidth that can be obtained from all lower priority actively messaging applications up to the bandwidth constraint of the higher priority application seeking bandwidth. If the priority of an application seeking bandwidth is too low to preempt active messaging applications, then the available bandwidth is the residual throughput.

In a preferred embodiment, the strategy module 34 effectuates message transmission preemption as follows. When preemption of a message being transmitted is necessary, the lowest priority actively messaging application is preempted.

If there are several actively messaging applications in the lowest priority group, bandwidth allocation to all applications in that group is limited in equal amounts to accommodate the new, higher priority application message. If the lowest priority group has insufficient bandwidth, all applications in that group are preempted and the next lowest priority group is deprived of the remaining required bandwidth in the same manner as described above for the lowest priority group.

Figure 6:
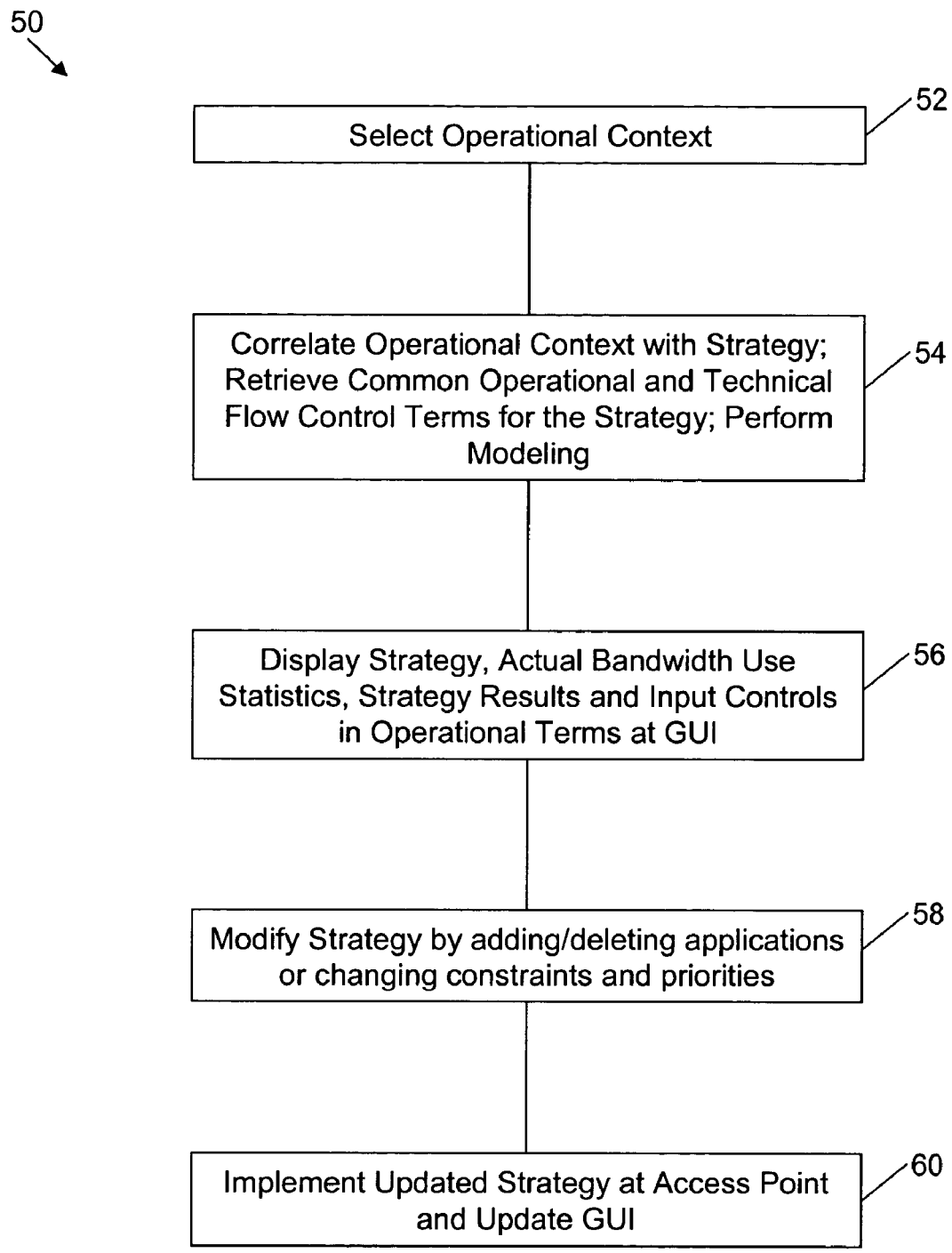
FIG. 6 is a flow diagram of a preferred embodiment of a process for monitoring and controlling network bandwidth allocation in accordance with the present invention.

FIG. 6 illustrates a high level flow diagram of a preferred process 50 for allocating and monitoring use of bandwidth at the BMAC 12 in accordance with the present invention. In accordance with the process 50, the modules of the BMAC apparatus 12 automate implementation of a bandwidth allocation strategy in a communications network, provide that bandwidth constraints and priorities for selected applications of a strategy can be dynamically modified, provide that the strategy and actual bandwidth use at an access point of the network can be monitored, in real time or substantially real time, at the GUI 38, and provide that the GUI 38 displays information in common operational terms readily understood by a network operator or user of an application.

For purposes of illustration, the process 50 is described below in connection with the operations that the modules of the BMAC apparatus 12 perform based on application messages received from the LAN 14, via the flow control device 16, and in view of the predetermined available bandwidth of the access point network router 18 to which the flow control device 16 is coupled. Referring to FIG. 2, the BMAC apparatus 12 preferably is initially installed and utilized in the communications network 10 to develop the content of the database of the application module 32, in terms of technical packet headers and corresponding known applications. For example, the BMAC apparatus 12 surveys, via the flow control device 16, message traffic and other information available from the LAN 14 for collecting the information needed to correlate technical packet headers with known applications.

Referring to FIG. 6, in step 52, an operator selects operational contexts at the GUI 38, which displays the operational situation in terms that are common and familiar to the operator. For example, in an operational setting on an aircraft carrier, an operational context may be defined by the operational terms OPSIT STRIKE, REDCON 3 and INFOCON BRAVO, which identify a high alert condition for the carrier requiring immediate transmission of time critical application messages and that all low and medium priority applications not be allocated bandwidth. In a preferred embodiment, the operational terms are arranged as input parameters on a bandwidth control video display screen generated at the GUI 38 display as shown in FIG. 4. The various combinations of the operational context terms selectable at the GUI 38 correspond to respective strategies stored at the strategy control module 34. In a preferred embodiment, the GUI 38 includes drop down menus of predefined values for selecting an operational context.

In step 54, the strategy module 34 retrieves the technical flow control information and the corresponding common operational term data in the strategy module 34 which define the bandwidth allocation strategy associated with the selected operational context. In addition, as the operator has completed selecting operational contexts, i.e., a strategy, at the GUI 38, the strategy module 34 commences a modeling process, as discussed in detail below in connection with the text accompanying the description of FIGS. 7, 9 and 10, to estimate whether the strategy fits within the available bandwidth of the access point, based on actual bandwidth use and application messaging requirement statistics stored at the statistics module 36. In a preferred embodiment, the strategy module 34 models the fit of the applications of a selected strategy, which can be an existing, initialized strategy or a strategy developed based on operator input, to the available bandwidth at the access point and in, substantially real time, displays a notice at the GUI 38, as discussed at step 56 or step 60, if any bandwidth insufficiencies are estimated. In a preferred embodiment, the strategy module 34 executes a modeling process each time that a strategy is selected or modified, or a new strategy is created, because the throughput at the access point does not necessarily remain the same over time.

Figure 4:
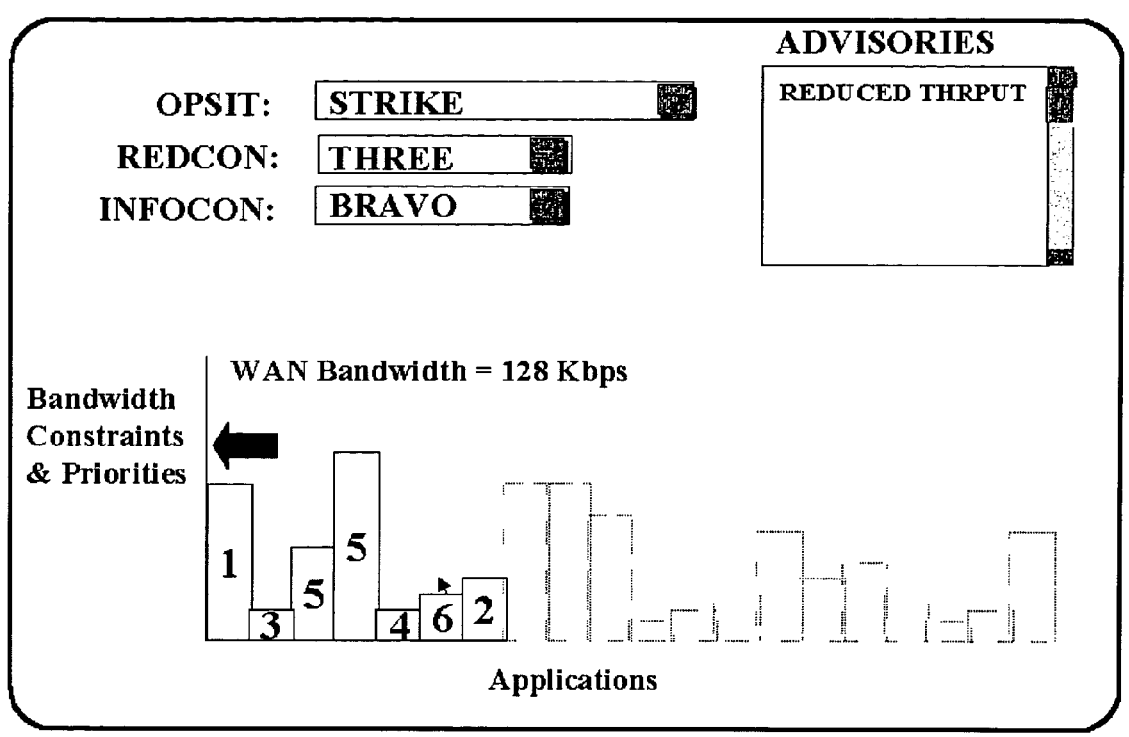
FIG. 4 is an exemplary bandwidth control video display generated at a graphical user interface of the bandwidth monitoring and allocation control apparatus of FIG. 2 in accordance with the present invention.
Figure 5:
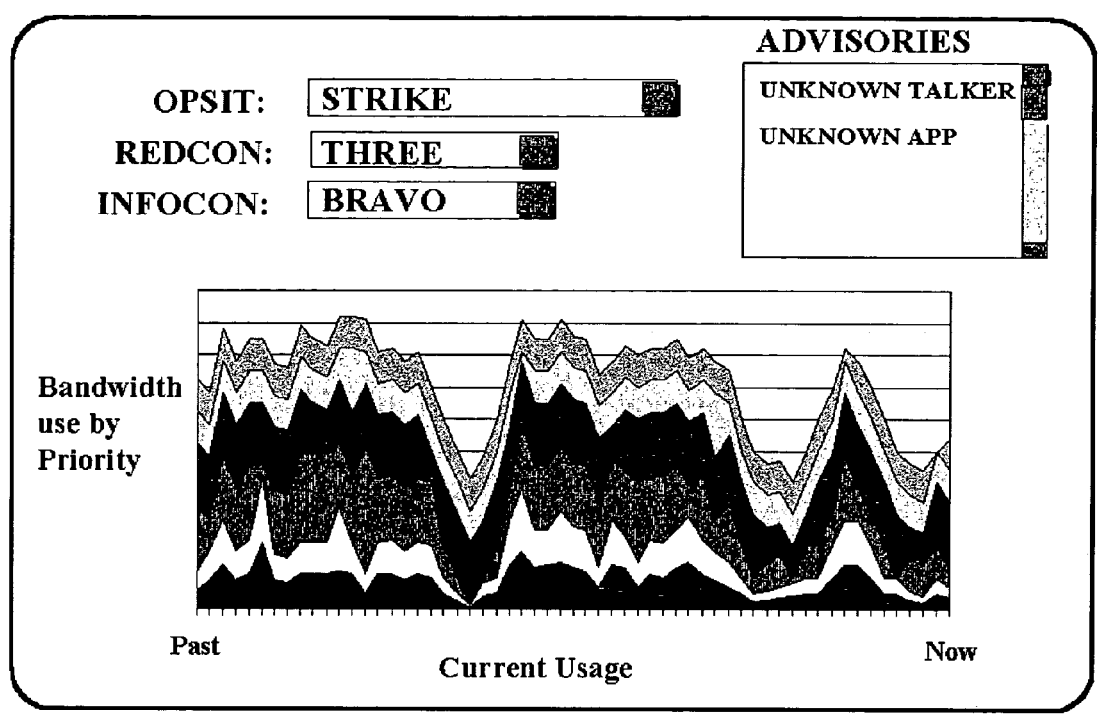
FIG. 5 is an exemplary bandwidth monitoring video display generated at a graphical user interface of the bandwidth monitoring and allocation control device of FIG. 2 in accordance with the present invention.

In step 56, the strategy module 34 transmits the operational term representation of the selected strategy, which includes, for example, bandwidth constraints and relative priorities, via the controller module 30 to the GUI 38 for display thereon, as shown in FIG. 4. In a preferred embodiment, the common operational terms displayed at the GUI 38 identify the priority and bandwidth constraints assigned to time critical network messages, such as a military attack command, and non-critical network messages, such as a power point document transmission. In addition, the statistics module 36 transmits an operational term representation of actual bandwidth use by applications of the selected strategy as a function of time and for a predetermined time interval, via the controller module 30, to the GUI 38 for display thereon in real time. FIG. 5 shows actual bandwidth use by applications on a bandwidth monitoring video display screen that the GUI 38 can generate, where the various applications are individually identified by respective indicia on the screen. In an alternative preferred embodiment, the GUI 38 displays bandwidth use by individual applications within a message category or in priority groups, based on the operational term data provided by the statistics module 36.

In accordance with the present invention, the controller module 30 continuously processes received messages, such as messages transmitted from the LAN 14 to the flow control device 16 and that the monitor 19 routes to the controller module 30, to provide for real time identification of the applications which seek to transmit messages to the access point router 18 and, therefore, require allocation of a portion of the available bandwidth of the router 18. For each received message, the controller module 30 separates the technical packet header from the associated technical data packet and, based on the data stored in the user application module 32, identifies the source of the message as being from a known or unknown application. If an application is unknown, the controller module 30 displays this information on the GUI 38 in, for example, an ADVISORIES section as "unknown app" or "unknown talker", such as shown in FIG. 5. The unknown application can constitute, for example, a legitimate unknown application. Further, the controller module 30 displays on the GUI 38, in real time and using operational terms, other data of interest transmitted thereto from the statistics module 38, such as, for example, notification of reduced actual throughput at the access point, to alert the operator of circumstances that may impact continued satisfactory operation of applications at the existing strategy. For example, the reduced actual throughput may be caused by a high rate of data packet retransmissions, which may indicate hardware or server software problems in the network 10, or by increased noise, which may indicate difficulties relating to establishing an RF data link at the antennae 24.

Further in step 56, the strategy module 34, in substantially real time and in common operational terms, displays on the GUI 38 the results of modeling performed based on the selected strategy to assist the operator in developing a strategy. For example, if the selected applications of a strategy, as constrained and prioritized, are estimated not to fit the available bandwidth, in other words, if the model estimates that one or more applications are likely to not perform satisfactorily, the strategy module 34 generates notification data in common operational terms and routes this data, via the controller module 30, to the GUI 38 for display so as to notify the operator to alter the strategy.

In step 58, the operator optionally enters input data at the GUI 38 to modify the selected strategy. In a preferred embodiment, the GUI 38 displays simple controls, in operational terms, that permit a user, with relative ease, to change the known applications included in a strategy and assign a bandwidth constraint and a relative priority to each application of a strategy. For example, the operator at the GUI 38 can delete known applications in the user application module 32, add a user application with an associated default bandwidth constraint and relative priority, or modify the bandwidth constraint and priority of a known application. In a preferred embodiment, the operator modifies the existing bandwidth constraints and priorities based on observation of actual bandwidth use by the applications that are illustrated on the GUI 38, as shown in FIG. 5, or based on changes in desired operational strategies. For example, an operator assigns a bandwidth constraint and a relative priority to message traffic from a specific application to avoid degrading the operational utility of the application.

In a preferred embodiment, service personnel responsible for configuration management ("CM") or automated data processing ("ADP") security, based on the technical packet header information or operational term data which is associated with an unknown application, obtained from the strategy module 34 and displayed at the GUI 38, enter technical parameter and operational term data at the GUI 38 for identifying an unknown application as a known application at the application module 32. The application module 32 associates such data with an existing bandwidth allocation class or strategy and suitably stores it in its database. Alternatively, CM or ADP personnel enter a bandwidth allocation class or strategy and any required technical parameter header information for the unknown application at the GUI 38, which the application module 32 and strategy module 34 suitably store in their respective databases. The class or strategy for the unknown application may already exist or be newly established by the operator at the GUI 38.

In a further preferred embodiment, the GUI 38 displays information, transmitted from the strategy module 34 or the controller module 30, that CM or ADP personnel can use to directly physically inspect the network site generating an unknown application when the identity of the unknown application cannot be unambiguously determined from the information previously stored in the database of the application module 32. For example, the controller module 30, from the unknown message, determines the IP and MAC addresses of a computer that is the source of the unknown application message and causes the GUI 38 to display such data in common operational terms. The display of these terms provides sufficient information to CM or ADP personnel to permit them to locate the computer which is the source of the unknown application message for purposes of examining its programming content.

In a preferred embodiment, the GUI 38, based on operational term data stored in and transmitted from the application module 32, lists known user applications and their locations in the network based on historical data and commonly used identifiers, such as IP addresses, media access control addresses, port numbers and protocol types.

In step 60, the strategy module 34 implements a new strategy based on the strategy modifications entered in step 58 and data stored in the databases of the modules 32 and 34. The strategy module 34 generates updated technical flow control information for the new strategy, based on the data stored in the modules 32 and 34, and transmits corresponding updated technical flow instructions to the controller module 30, which routes the technical instructions to the flow control device 16. In addition, the strategy module 34 generates updated common operational terms representative of the new strategy and routes the updated operational terms to the GUI 38 to update the display and permit the operator to continue to modify the strategy, as desired. Further, the statistics module 36 continues to route updated, real time actual bandwidth use data, in common operational terms, to the GUI 38 for display and the strategy module 34 provides updated modeling results, in operational terms and based on the new strategy, to the GUI 38 for display.

In a preferred embodiment, the statistics module 36 monitors bandwidth utilization for a number of predefined conditions selected by the operator at the GUI 38 and notifies the operator, in steps 56 or 60, of perceived events of interest at the GUI 38. Perceived events of interest can include, for example, significant and prolonged bandwidth use by a single application and a precipitous drop in available throughput. Similarly, the controller module 30 can determine that common worms, viruses, etc., are present in a message and suitably notify the operator at the GUI 38 of such events of interests.

In a preferred embodiment where an operational context includes only a relatively few applications or a single application, the BMAC apparatus 12 controls bandwidth allocation at the flow control device 16 using simple pre-established bandwidth control allocation strategies. The strategies can be easily established by, for example, persons familiar with technical network operating terms and authorized to control communications network operating performance. Further, the strategies can be easily maintained by persons who are unfamiliar with the technical aspects of communications network operations, because the strategies, and related control inputs, are preferably displayed at the GUI 38 in terms specific to, and commonly known by, an operator of a communications network of an enterprise, such an aircraft carrier, in which the BMAC apparatus 12 is installed.

In a preferred embodiment, the strategy module 34 estimates application response time for a bandwidth allocation and an allocation strategy in relation to whether the influence of concurrent applications is present or absent. In a preferred embodiment where the total bandwidth requirement of messaging applications is small in relation to the available bandwidth at an access point, the strategy module 34 uses previously generated stand alone performance estimates for each of the applications to estimate response times, because the use of bandwidth by the messaging applications is essentially equivalent to transmission of a message from a single messaging application. In an alternative preferred embodiment where the total bandwidth requirement of messaging applications is about the same size as the the available network bandwidth at an access point, the applications are considered to be concurrent applications, such that the modeling accounts for the effect that the network performance of each application has on the network performance of other applications. The strategy module 34, consequently, restricts allocated bandwidth for the concurrent applications to bandwidth that is unused by other applications, with no priority pre-emption, or priority users may be enabled. For example, if the strategy module 34 performs priority pre-emption, the lowest priority messaging application is deprived bandwidth by all messaging applications having a higher priority. The modeling is performed in this manner until the concurrent applications are properly modeled and potential unsatisfactory network performance due to concurrent application influence is minimized.

Figure 7:
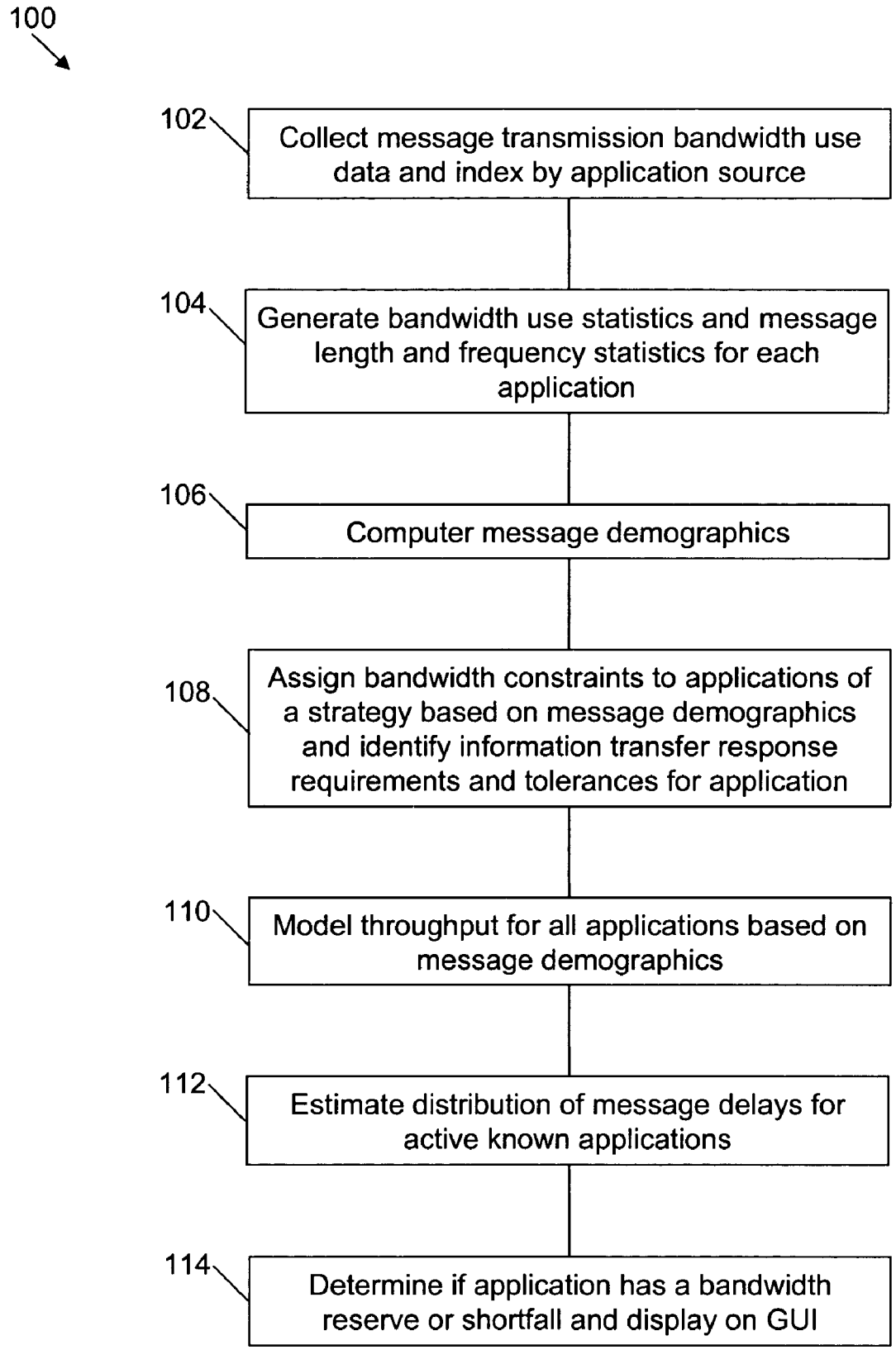
FIG. 7 is a high level flow diagram of a preferred process for modeling throughput allocation for applications of a selected strategy based on actual bandwidth use statistics in accordance with the present invention.

In accordance with the present invention, when a new or modified strategy is selected in the process 50, such as in steps 52 or 58, the strategy module 34 and the statistics module 36, in combination, perform a process 100, as shown in FIG. 7, for modeling throughput allocation for all applications in the selected strategy based on actual bandwidth use data for the router 18 access point. Based on the modeling results, the strategy module 34 displays notices at the GUI 38 as to whether the operating performances of applications of the strategy, i.e., the time between transmission of a message from an application and the completion of routing through an access point ("the information transfer response"), are likely to be operationally acceptable. In other words, the BMAC apparatus 12 determines whether a certain bandwidth allocation strategy, which defines the bandwidth constraints and priorities for the respective applications of the strategy, would likely result in satisfactory operating performance for each of the applications of the strategy. The modeling accounts for the impact that assigning different bandwidth constraints and relative priorities to applications of a strategy has on the operational performance of the applications of the strategy.

Referring to FIG. 7, in step 102 the statistics module 36 processes actual bandwidth use data for messages transmitted to the router 18 access point, which the controller module 30 retrieves from the monitor module 19 of the control flow device 16, to generate application message data arrays indexed by application and including message start and end time and message length for each message included in the retrieved bandwidth use data. The statistics module 36 identifies the source of the messages as from a particular known application, or generally from an unknown application, by comparing the technical packet headers for the respective messages, which are included in the retrieved use data, with data stored in the user application module 32. In a preferred embodiment, the application message data arrays are generated from retrieved bandwidth use data that was collected over a duration sufficient to capture all, or most preferably greater than 90% of, application network activity. For example, although many aircraft carrier operations could be as short as a single four hour watch (shift), the duration depends on the time interval after which all application message types are repeated with different content ("cycle time"), which can be one day and or one week.

In step 104, the statistics module 36, based on the application message data arrays, generates bandwidth use statistics for each known application, each defined priority group and the group of unknown applications, and also message length and frequency statistics for each known application for a predetermined time interval, such as four hours. In addition, the statistics module 36 identifies the statistics for each known application with an associated application bandwidth constraint, if any, existing for time intervals that the bandwidth use data for the access point was obtained. It is noted that bandwidth constraints, as applied in connection with a strategy, can affect application information transfer performance so as to distort estimates of the time between messages for an application. In a preferred embodiment, the statistics module 36 determines, from message start and stop times for an application, whether the bandwidth constraint for the application affects information transfer performance and, if yes, does not use this data to generate statistics information in step 104.

Figure 8:
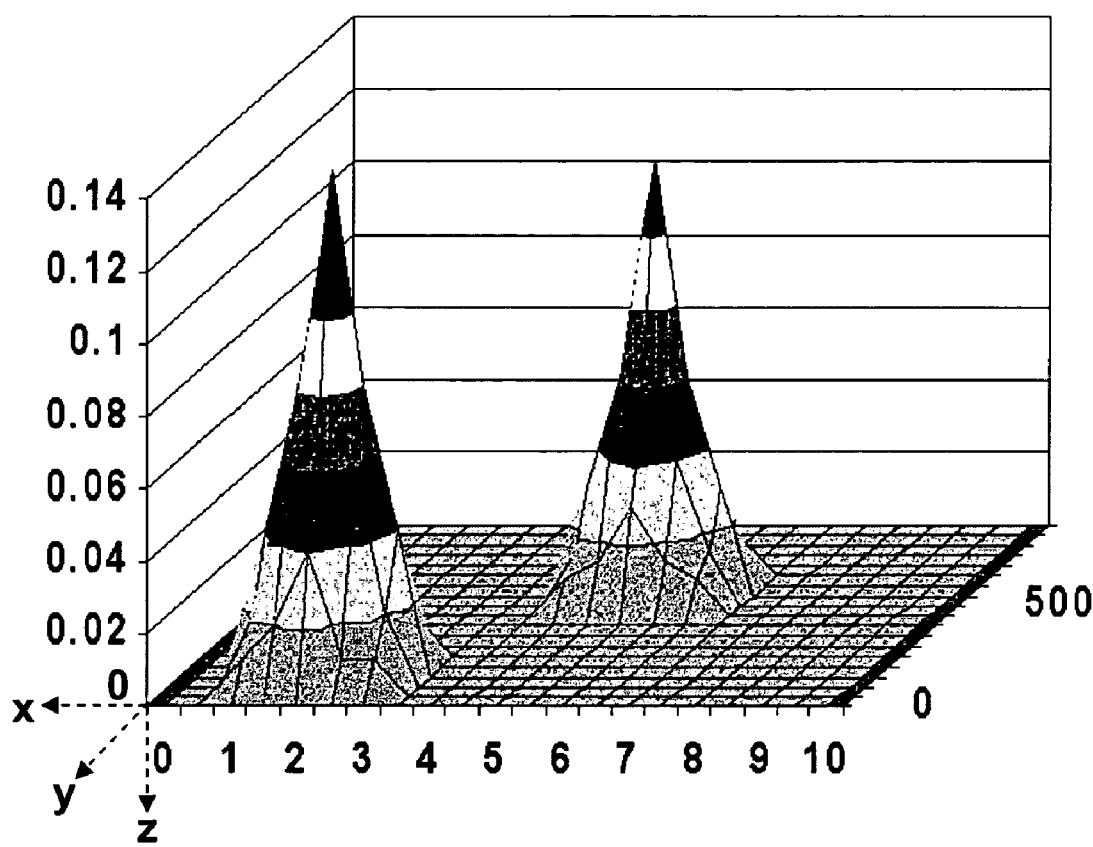
FIG. 8 is a graphical illustration of message length and time between messages statistics generated from actual bandwidth use data collected and processed in accordance with the present invention.

In step 106, the statistics module 36, based on the statistics information complied in step 104, generates a statistical frequency distribution for applications in terms of message length and time between messages ("message demographics"). FIG. 8 is a graphical representation of an exemplary statistical frequency distribution for applications determined by the strategy module 34, where the x axis is time between messages, i.e., the time from the end of a message transmission to the transmission of the next message, the y axis is message length and the z axis probability of applications. Referring to FIG. 8, the distribution is bimodal, which suggests that typically the sample will not be homogeneous such that its elements are obtained from two or more different application populations or possibily from two or more sub-components of one application. The shape of each component of the bimodal distribution is shown as more or less normally distributed without significant skew, which indicates significant symmetry around the typical message, both in duration and in time. The excess of peakiness of the probability function (kurtosis in a Gaussian distribution) indicates that the tails of the distribution are fairly short, which would be expected with relatively contant size messages and freely running software applications that repeat their function on a regular basis. As the total volume under the distribution is one, this implies statistical knowledge of the time to the next message if the duration of the current message is known, and vice versa. The shading indicates levels of uncertainty which in a Gaussion distribution would be numbers of standard deviations from the mean. In a preferred embodiment, the statistics module 36 continuously updates the message demographics to reflect recent usage history.

In step 108, the statistics module 36, based on the message demographics, identifies bandwidth constraints for the respective applications of the strategy that would ensure a predictable and satisfactory information transfer response distribution for those applications. The bandwidth constraint assigned to an application substantially determines whether the information transfer response for messages from the application is within acceptable operational performance levels.

Further in step 108, the statistics module 36, also based on the message demographics, identifies applications by application response type, where the type is determined based on application response time ("ART") requirements for transfer of the information contained in messages associated with the applications of the type. For example, MICROSOFT OFFICE type applications have network communications characteristics that are considerably different from those of a combat system application on an aircraft carrier in terms of ART requirements. Some combat system applications, such as in RADAR and SONAR, may require very fast turn around, i.e., very short ART, have real time or near time response requirements, have very short message structures and occur very frequently in a communicaitons network time frame. In contrast, a MICROSOFT OFFICE application is user controllered, may not have real time requirements, i.e., very long ART, have very long message structures and occur infrequently in a communicaitons network time frame. In addition, the statistics module 36 uses the message demographics to identify, for each application, tolerances to variations in response times and the respective likely affect on transfer of information performance of the application. The variations in response times may occur, for example, during situations of degraded performance in the network that decrease the available bandwidth at the access point.

Referring to FIG. 6, in a preferred embodiment, the GUI 38 displays an operator selectable input in steps 56 or 60 of the process 50 which, upon selection by the operator, fixes bandwidth allocation for an application having the computed message demographics, which are presented on the GUI 38 display. If that application is the only application transmitting for that allocated bandwidth, the statistics module 36 uses the message demographics for the application to compute the time required to transmit messages of a particular length and also the message frequency, in other words the required bandwidth of the application, and then displays such information on the GUI 38.

Figure 9:
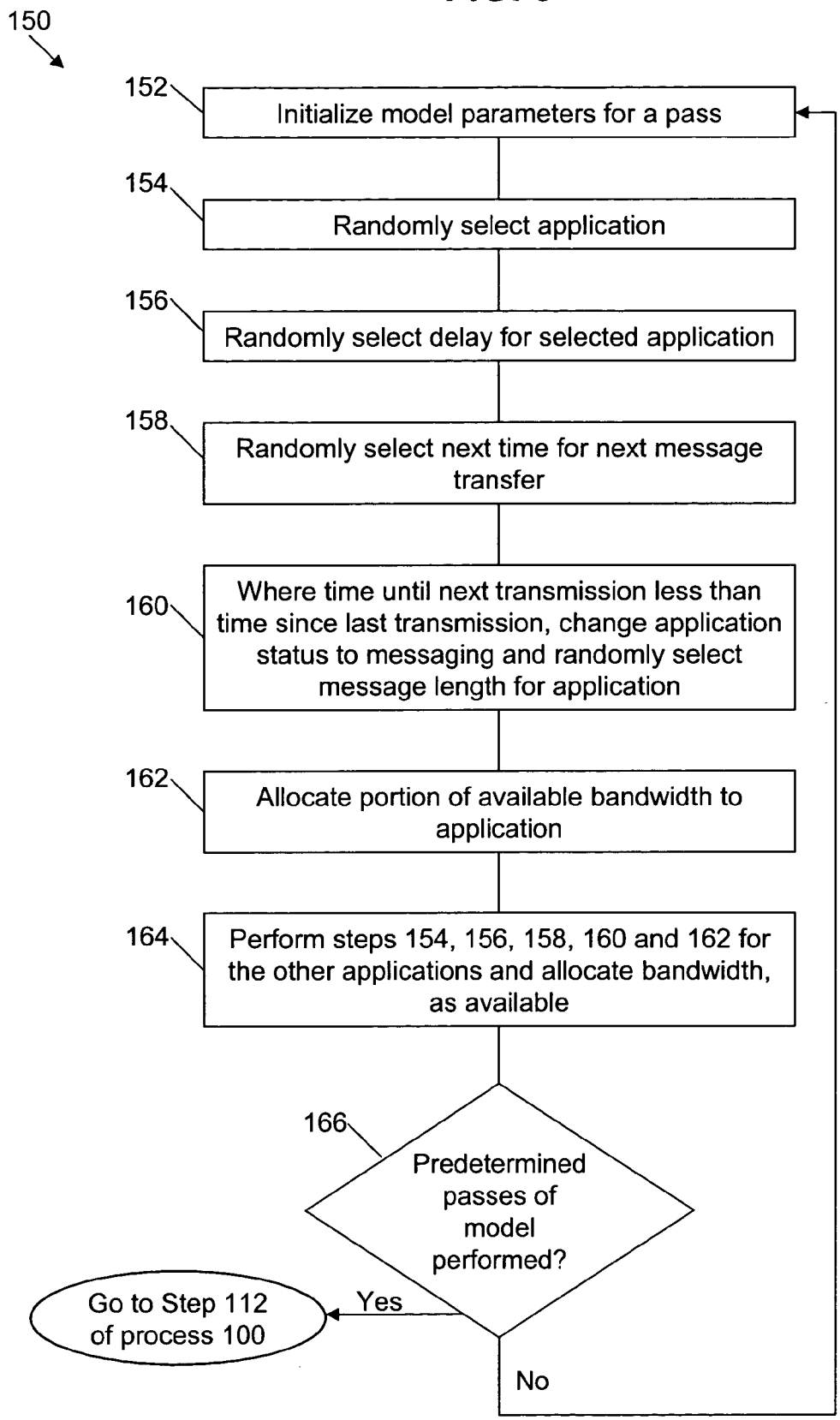
FIG. 9 is a flow diagram of a preferred process for generating modeling data for use in the process of FIG. 7 in accordance with the present invention.

Referring again to FIG. 7, in step 110, the strategy module 34 preferably performs a subprocess 150, as shown in FIG. 9, for modeling the throughput allocation for all of the applications of a selected strategy based on the message demographics and other statistics information identified in steps 104, 106 and 108 of the process 100. In accordance with the model, the strategy module 34 analyzes the known applications of the strategy one at a time, determines whether any of the applications are actively messaging and simulates bandwidth allocations according to the strategy for the applications that are actively messaging. After the strategy module 34 analyzes all of the known applications in a first pass of the model, which involves stepping time through a predetermined time duration and collecting data for each application, where the collected data includes the number of active periods during the pass, message length, time since last message, allocated bandwidth, the number of pre-emptions and time for message transfer, the module 34 estimates response times for each actively messaging application based on the allocated bandwidth and the size of the message each is transmitting. The time duration preferably is one hundred times longer than the time interval for any application that provides for satisfactory information transfer for 90% of the messages of the application ("LNI"), as represented in the message demographics. In a preferred embodiment, the time duration is large enough to provide that 100 samples of message transmission for an application are analyzed in each pass of the model. In a preferred embodiment, at least 100 passes of the model are performed before response estimates are computed.

In a preferred embodiment, the modeling relies upon the results of analyses of communications network information transfer performance for operational situations having different predetermined strategies and different available bandwidths at an access point, where the analyses have been performed offline, to generate statistical estimates of bandwidth constraints for respective applications that would result in acceptable information transfer response at an access point having a predetermined available bandwidth. This statistical data is collected and preferably used because, as is well known in the art, the demand for bandwidth by applications is statistical with respect to the time interval between requests for message transfer from an application and the size of the message transferred.

Referring to FIG. 9 in step 152 the strategy module 34 initializes variables to be used in the subprocess 150, such as setting a time counter to zero, selecting applications to be modeled, selecting a minimum and maximum delay range, selecting a particular set of message demographics data, selecting a time interval and selecting a seed value for a random number generator, for modeling throughput allocation for all applications in a strategy. In a preferred embodiment, the operator may select default values for the variables at the GUI 38.

In step 154, the strategy module 34 randomly selects, preferably using a uniformly distributed random selection process, an application from the group of applications of the selected strategy which has not yet been analyzed in a pass of the model.

As messages from respective applications usually do not all start simultaneously, in step 156 the strategy module 34 makes an initial assumption about the time since the last message transmission for the application, i.e., the delay, by randomly generating a delay value from a uniform distribution and width equal to LNI.

In step 158, the strategy module 34 randomly generates a next time for next message transfer value, i.e., the time that the next message from the application would be transferred, from the time distribution between message transfers for the application, which is also obtained from the message demographics.

In step 160, if the time until next transmission value is less than the time since last transmission, the strategy module 34 changes the status of the application from initially not messaging to actively messaging and randomly generates a length value for the message to be transmitted from a distribution of the message lengths of the application, which is also obtained from the message demographics.

In step 162, the strategy module 34 allocates a portion of the available bandwidth to the application in accordance with the bandwidth constraint of the application. Then in step 164, the strategy module 34 again performs steps 154, 156 and 158, and steps 160 and 162, as suitable, such that the module 34 randomly selects the remaining applications of the strategy, randomly selects delay and next time until transmission values for the respective remaining applications and, as suitable, randomly selects message lengths for the actively messaging applications, and allocates, in view of the selected strategy, remaining unallocated portions of the available bandwidth of the access point to the applications as they become active in accordance with a preferred subprocess 200, as illustrated in FIG. 10.

Figure 10:
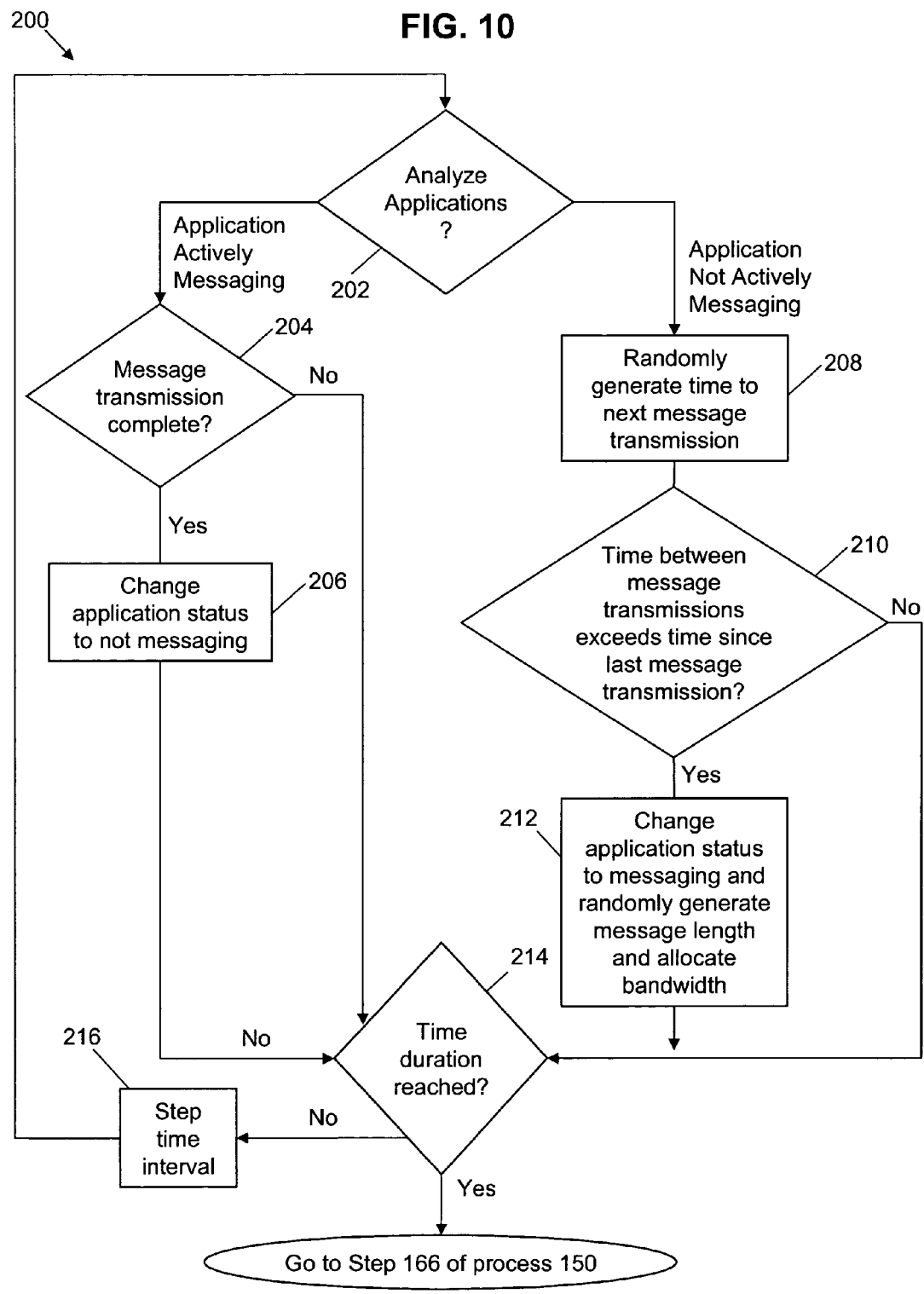
FIG. 10 is a flow diagram of a preferred process for generating modeling data for a complete pass through a model in accordance with the present invention.

Referring to FIG. 10, in step 202 the strategy module 34, for each application of the strategy, where the order of applications is randomly selected, determines whether the application is actively messaging or not actively messaging. If the application is actively messaging, in step 204 the strategy module 34 determines, based on the message start time, the size of the message transmitted and the bandwidth allocated to the application, whether message transmission is complete. If yes, in step 206 the strategy module 34 changes the status of the application to not messaging. If no, the strategy module 34 performs step 214.

If the determination in step 202 is that the application is not actively messaging, in step 208 the strategy module 34 randomly generates a time to next transmission value. Then in step 210, the strategy module 34 determines for the application whether the time between transmissions exceeds the time since the last message transmission. If yes, in step 212, the strategy module 34 sets the status of the application to active, randomly generates a length value for the message based on the application message length distribution information and allocates bandwidth to the application in accordance with the throughput for the access point, bandwidth utilization thus far modeled, the bandwidth constraint for the application and application priority. The throughput value is operator entered, or based on a determination of actual bandwidth use at the access point.

The strategy module 34 performs step 214 following steps 204, 206 or 212 and, in step 214, determines whether the time counter has reached the predetermined time duration. If no, the strategy module 34 in step 216 increments the counter a predetermined time interval and then proceeds to perform step 202. The time interval, preferable, is one-tenth of the smallest 90% interval ("SNI") of any application because the statistical model is largely based on a correlation process which is well known in the art. The combination of a TB of at least 100 times the LNI and an SNI of at least 10 results in 1000 or more samples for each of the passes through the model. If yes, the strategy module performs step 166 of the process 150.

In step 166, the strategy module 34 determines how many passes of the model were performed. If a predetermined number of passes has not been performed, the strategy module 34 proceeds to step 152 of the subprocess 150, which results in another pass through the model. Thus, the applications of the strategy are analyzed through numerous passes of the model in view of the message demographics. If the predetermined number of passes has been performed, the strategy module 34 proceeds to step 112 of the process 100.

Referring to FIG. 7, in step 112, the strategy module 34 compiles an overall estimate of the distribution of message delays, i.e., response times, for each active application based on the data collected by performing multiple passes of the model. The distributions for each application are retained in the database of the strategy module 34 until the strategy is changed, which causes modeling to begin once again.

Figure 11:
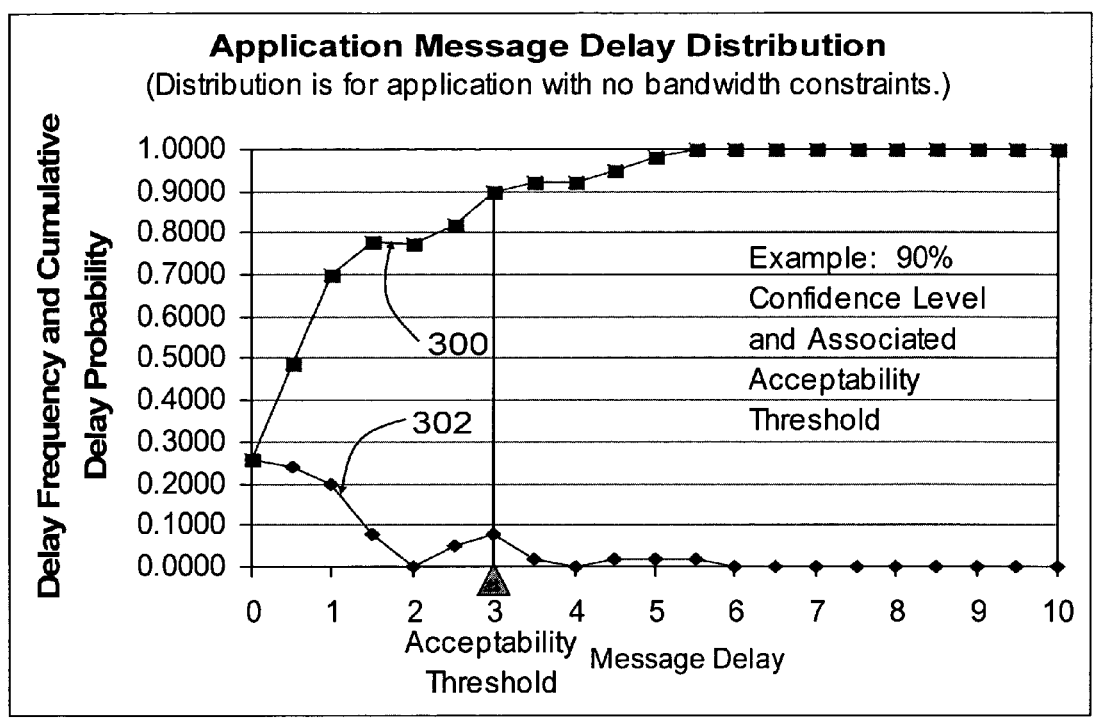
FIG. 11 is a graphical illustration of an application message delay distribution obtained by performing the process of FIG. 7 in accordance with the present invention.

In a preferred embodiment, the distribution is a one-dimensional frequency distribution of application message delays with delay on the abscissa and frequency on the ordinate as shown in FIG. 11. The strategy module 34 estimates adequate bandwidth support for operation based on the delay distribution. In this one-dimensional distribution, it is assumed that all messages for the subject application are equally time critical. The application message delay distribution represents a cumulative distribution and shows the likelihood or confidence that all message delays are less than the corresponding delay value on the abscissa. The application message delay distribution, which is preferably determined in the absence of competing applications and without bandwidth constraints, constitutes a nominal delay distribution. The nominal delay distribution for each application is invariant, unless the application message distribution changes, and is computed in advance and stored in the strategy module 34 for reference.

Referring to FIG. 11, curve 300 is the probability frequency distribution of message delays and curve 302 is the cumulative probability of message delay and represents the confidence that all message delays for the application are below the abscissa value. For each application, a confidence level is specified such that, if the threshold message delay is achieved with that probability or greater, the application performance is operationally acceptable. The actual confidence level may differ between applications. In a preferred embodiment, a correct value for an application is set by experience and then tuned empirically. The application confidence level applies to nominal application message delay distribution.

Referring again to FIG. 11, the acceptability threshold is the message delay value for an application that corresponds to the confidence level and represents the minimum application message delay at which application performance is operationally acceptable with the stated level of confidence. The acceptability threshold occurs on the nominal application message delay distribution at the point that the cumulative probability reaches the confidence level.

For a modeled application message delay distribution, the stated confidence level, in general, occurs at a delay value that is different from the acceptability value. If the delay value is less than the acceptability threshold, then application performance is better than prescribed. If it is greater than the acceptability threshold, then application performance is worse than required.

Figure 12A:
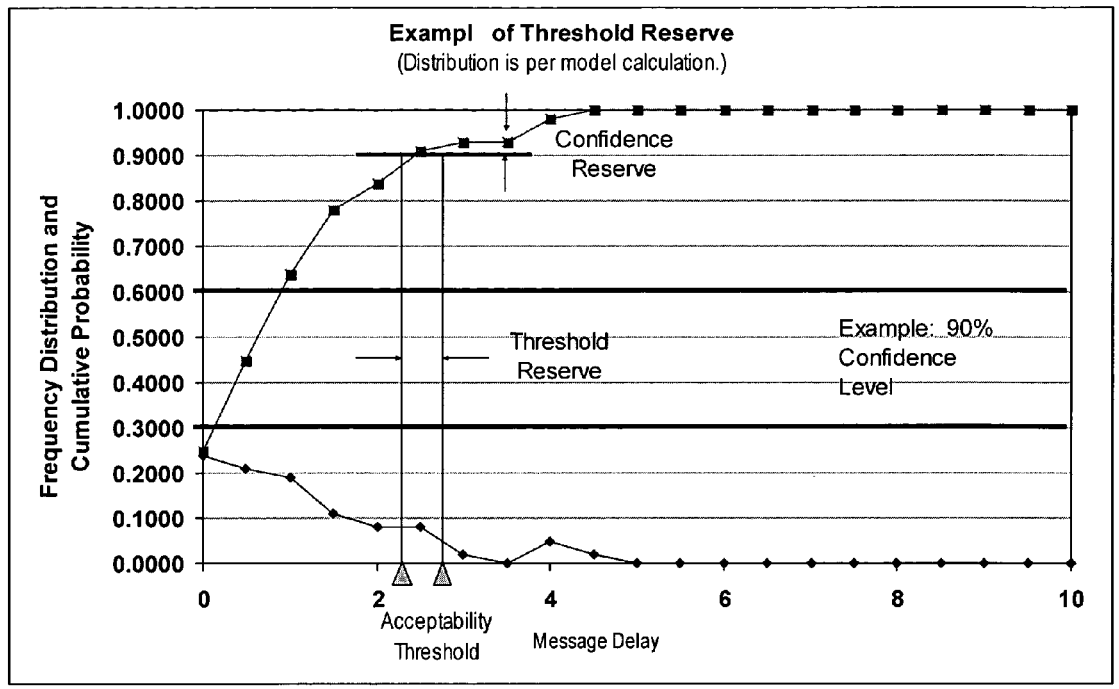
FIG. 12A is a graphical illustration of confidence and threshold reserve margins for an application message delay distribution obtained by performing the process of FIG. 7 in accordance with the present invention.

FIG. 12A graphically illustrates threshold reserve for a message delay distribution for an application of a selected strategy computed by modeling in accordance with the present invention. Referring to FIG. 12A, a confidence margin represents the difference between confidence level and the confidence (cumulative probability) at the prescribed acceptability threshold. If confidence at the acceptability threshold exceeds the confidence margin, then application performance is better than required and there is a confidence reserve. If the confidence is lower than the confidence level, then application performance is worse than required and there is a confidence shortfall. The confidence margin can indicate if a shortfall is significant, such that a larger bandwidth constraint allocation for an application is appropriate, or if the estimated support is so high that the bandwidth constraint for the application can decreased for the benefit of other applications.

Figure 12B:
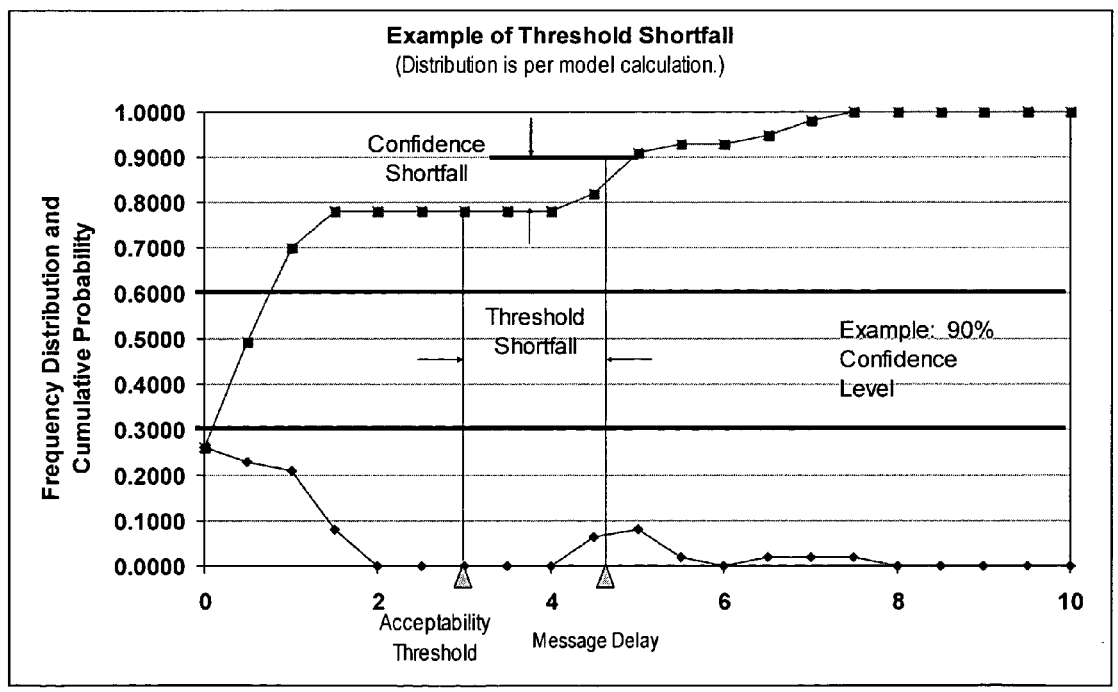
FIG. 12B is a graphical illustration of confidence and threshold shortfall margins for an application message delay distribution obtained by performing the process of FIG. 7 in accordance with the present invention.

FIG. 12B graphically illustrates threshold shortfall for a message delay distribution for an application of a selected strategy computed by modeling in accordance with the present invention. Referring to FIG. 12B, threshold margin is similar to the confidence margin, except that it measures the difference between the application message delay at the confidence level and the acceptability threshold. If the confidence level on the modeled distribution is reached at a lower message delay value than the acceptability threshold, then application performance is better than required. If the confidence level is attained at a greater delay value than the acceptability threshold, then application performance is worse than required. The threshold margin can be used to estimate the incremental bandwidth constraint increase required for an application to perform satisfactorily, or the amount that the bandwidth constraint on the application can be tightened to benefit other applications.

Referring again to FIG. 7, following step 112, the strategy module 34 in step 114 applies appropriate confidence level and acceptability thresholds to determine if any applications in the strategy have a delay threshold shortfall or reserve. If there is a threshold shortfall, the strategy module displays a notice at the GUI 38. In a preferred embodiment, the strategy module 34 displays at the GUI 38 the distributions with threshold and confidence levels as graphically illustrated in FIGS. 12A and 12B.

In a further preferred embodiment, the strategy module 34 estimates required access point bandwidth based on the applications likely to be included in a strategy and the process 100 is performed at an assumed access point bandwidth that corresponds to the smallest throughput anticipated to be adequate. If the modeling results indicate, for any strategy, that the assumed throughput results in inadequate application performance, the strategy module 34 incrementally increases the throughput and then again models the applications until all applications are estimated to perform adequately. The throughput that ultimately is selected indicates the overall bandwidth that must be available for allocation to the strategy. This overall estimate bandwidth is much less than the arithmetic sum of application acceptable thresholds, which has the practical effect of reducing the overall required network bandwidth and, thus, costs associated with, for example, use of bandwidth and the size of RF antennas, power requirements, fuel and manpower needed to operate a communications network, such as on an aircraft carrier.

Thus, the present invention greatly smoothes the transfer of application messages through an access point and improves user application efficiency where, for example, multiple LANs are merged into a larger network, which may include another LAN or a WAN access point. Further, the present invention advantageously improves integrated aggregate performance of network centric systems and makes bandwidth use readily known to an operator, which provides for better command and control information that can be used to implement the most desired bandwidth allocation strategy for a particular operational situation.

Although preferred embodiments of the present invention have been described and illustrated, it will be apparent to those skilled in the art that various modifications may be made without departing from the principles of the invention.

What is claimed is:

1. A method for dynamic control of bandwidth allocation to each of a plurality of applications in a communications network, the communications network including an access point to a first network from a second network where the applications are hosted, a network flow control device coupled to the second network and regulating message traffic from the applications to the access point, and an apparatus controlling bandwidth allocation to each application via the network flow control device, the method comprising:
   determining, via the apparatus, whether a message received by the network flow control device is from a known application or an unknown application, wherein each known application corresponds to a respective one of the plurality of applications that have an identifier stored by the apparatus and the received message includes a packet header reflecting one of the applications as being the source of the received message;
   generating one or more network flow control instructions for controlling allocation of a portion of a predetermined bandwidth of the access point to the received message in accordance with a bandwidth allocation strategy, wherein the strategy includes at least one known application and a bandwidth constraint for each of the least one known applications and a bandwidth allocation priority for each of the least one known applications;
   monitoring each application's actual bandwidth usage at the access point;
   generating message demographic statistics including message lengths and frequency of occurrences for each of the monitored applications, based on the actual bandwidth use of the respective monitored application;
   computing a message distribution delay period for each of the known applications included in the bandwidth allocation strategy based on the message demographic statistics,
   wherein the computing further comprises a modeling process comprising the steps of:
   identifying each of the applications included in the bandwidth allocation strategy that are actively messaging for a predetermined duration;
   simulating bandwidth allocations according to the bandwidth allocation strategy for each of the applications identified as actively messaging; and
   collecting data representative of the number of active periods, message length, time since last message, allocated bandwidth, number of pre-emptions and time for message transfer for each application included in the bandwidth allocation strategy.

2. The method of claim 1 further comprising:
   displaying on a graphical user interface whether the received message is a known application or an unknown application.

3. The method of claim 2 further comprising:
   when it is determined that the received message is from an unknown application, determining whether the unknown application is legitimate based on at least one input received by the graphical user interface and an input based on intelligent agent technology or artificial intelligence technology processing.

4. The method of claim 1 further comprising:
   monitoring each application's actual bandwidth usage at the access point; and generating message demographic statistics including message lengths and frequency of occurrences for each of the monitored applications, based on the actual bandwidth use of the respective monitored application.

5. The method of claim 4 further comprising:
   assigning bandwidth constraints to the applications included in the bandwidth allocation strategy based on the message demographic statistics.

6. The method of claim 4 further comprising:
   displaying the message demographic statistics on a graphical user interface.

7. The method of claim 4 further comprising:
   computing a message distribution delay period for each of the known applications included in the bandwidth allocation strategy based on the message demographic statistics.

8. The method of claim 1, wherein the simulating bandwidth allocations step further comprises:
   changing a status of each application identified as actively messaging to not actively messaging once message transmission of the respective application is complete;
   randomly generating a time until a next message transmission for an application identified as not actively messaging;
   changing the status of the application identified as not actively messaging to actively messaging if the time until the next message transmission is less than the time since last message transmission for the identified not actively messaging application; and
   assigning a randomly generated message length, based on the message demographics statistics, to a message of the application whose status was changed to actively messaging.

9. The method of claim 1 further comprising: when the received message is determined to be from a known application, delaying transmission of the received message to the access point based on the bandwidth allocation priorities and message bandwidth requirements of other known applications simultaneously competing for a portion of the available bandwidth at the access point.

10. The method of claim 1 further comprising:
    displaying the bandwidth allocation strategy on a graphical user interface following an input selection of the bandwidth allocation strategy.

11. The method of claim 1 further comprising:
    displaying input selections for modifying bandwidth constraints and bandwidth allocation priorities of known applications on a graphical user interface.

12. The method of claim 11 further comprising:
    computing a message distribution delay for each of the known applications based on a new bandwidth allocation strategy and the message demographic statistics, wherein the new bandwidth allocation strategy is generated from at least one of the input selections.

13. The method of claim 1 further comprising:
    transmitting flow control instructions to the network flow control device effective to control bandwidth allocation for each message received from each of the known applications in accordance with the bandwidth allocation strategy.

14. A system for dynamically controlling bandwidth allocation to each of a plurality of applications in a communications network, the communications network including an access point to a first network from a second network where the applications are hosted and a network flow control device coupled to the second network and regulating message traffic from the applications to the access point, the system comprising an apparatus controlling bandwidth allocation to each application via the network flow control device, the apparatus comprising:

an application module effective to store identifiers indicative of known applications from among the plurality of applications hosted on the second network;

a controller module coupled to the application module and to the network flow control device, the controller module being effective to receive each message received by the network flow control device from each application, wherein each of the received messages includes an identifier indicative of a respective one of the applications from which the message originated, and wherein the controller module identifies whether each received message is from a known application or an unknown application based on the identifiers stored in the application module and the identifier of the respective received messages;

a strategy module for storing a bandwidth allocation strategy, wherein the bandwidth allocation strategy includes at least one of the known applications, a bandwidth constraint and a bandwidth allocation priority for each of the least one known applications, wherein the strategy module generates network flow control instructions for the network flow control device effective to allocate a portion of a bandwidth associated with the access point to each received message from a respective one of the known applications included in the bandwidth allocation strategy; and a statistics module coupled to the controller module effective to store data representative of actual bandwidth use by applications at the access point, wherein the statistics module generates, based on the actual bandwidth use data, message demographic statistics including message lengths and frequency of occurrences for the known applications;

wherein the strategy module computes a message distribution delay for each of the known applications included in the bandwidth allocation strategy based on the message demographic statistics, and wherein the strategy module performs a modeling process for computing each message distribution delay, the modeling process comprising:

identifying each of the applications included in the bandwidth allocation strategy that are actively messaging for a predetermined duration;

simulating bandwidth allocations according to the bandwidth allocation strategy for each of the applications identified as actively messaging; and collecting data representative of the number of active periods, message length, time since last message, allocated bandwidth, number of pre-emptions and time for message transfer for each application included in the bandwidth allocation strategy.

15. The system of claim 14 further comprising: a graphical user interface ("GUI") for displaying data stored at or generated by at least one of the application module, the strategy module and the controller module.

16. The system of claim 14, wherein the controller module causes the GUI to display-whether each received message is from a known application or an unknown application.

17. The system of claim 16, wherein, after a respective received message is identified as being from an unknown application, the controller module determines whether the unknown application is legitimate based on at least one of inputs received from the GUI and an input based on intelligent agent technology or artificial intelligence technology processing.

18. The system of claim 14 further comprising: a statistics module coupled to the controller module effective to store data representative of actual bandwidth use by applications at the access point, wherein the statistics module in generates, based on the actual bandwidth use data, message demographic statistics including message lengths and frequency of occurrences for the known applications.

19. The system of claim 18, wherein the statistics module routes the message demographic statistics to the GUI for display.

20. The system of 18, wherein the strategy module computes a message distribution delay for each of the known applications included in the bandwidth allocation strategy based on the message demographic statistics.

21. The system of 14, wherein the simulating bandwidth allocations step further comprises:

changing a status of each application identified as actively messaging to not actively messaging once message transmission of the respective application is complete;

randomly generating a time until a next message transmission for an application identified as not actively messaging;

changing the status of the application identified as not actively messaging to actively messaging if the time until the next message transmission is less than the time since last message transmission for the identified not actively messaging application; and assigning a randomly generated message length, based on the message demographic statistics, to a message of the application whose status was changed to actively messaging.

22. The system of claim 14, wherein the strategy module delays transmission of each received message identified by the controller module as being from a known application to the access point based on bandwidth allocation priorities and message bandwidth requirements of known applications simultaneously competing for a portion of the available bandwidth at the access point.

23. The system of claim 14, wherein the strategy module routes the bandwidth allocation strategy to the GUI for display.

24. The system of claim 23, wherein the GUI displays input selections for modifying bandwidth constraints and bandwidth allocation priorities of the known applications.

25. The system of claim 24, wherein the strategy module computes a message distribution delay for each of the known applications of a new bandwidth allocation strategy based on the message demographics, wherein the new bandwidth allocation strategy is generated by the strategy module from at least one of the input selections.

26. The system of claim 14, wherein the strategy module transmits flow control instructions to the network flow control device effective to control bandwidth allocation for each message received from each of the known applications in accordance with the bandwidth allocation strategy.

* * * * *